United States Patent [19]

Swanson et al.

[11] 4,302,660
[45] Nov. 24, 1981

[54] DOOR OPENING MECHANISM FOR PARTIALLY OPENING A TOASTER OVEN DOOR

[75] Inventors: Charles E. Swanson, Chicago; Roy W. Hector, Woodridge, both of Ill.

[73] Assignee: Sunbeam Corporation, Chicago, Ill.

[21] Appl. No.: 70,229

[22] Filed: Aug. 27, 1979

Related U.S. Application Data

[62] Division of Ser. No. 750,367, Dec. 13, 1976, Pat. No. 4,189,632.

[51] Int. Cl.³ .................. A47J 37/04; A47J 37/08
[52] U.S. Cl. ............................ 219/391; 126/340; 49/1; 49/30; 219/413
[58] Field of Search .......................... 219/390-393, 219/412-414, 521; 126/190-191, 192, 194, 195, 197, 340; 99/331, 333, 326-328, 385, 391, 392, 393, 329 R, 389; 49/1, 2, 29-32; 160/1, 2, 6; 292/DIG. 66

[56] References Cited

U.S. PATENT DOCUMENTS

| | | | |
|---|---|---|---|
| 2,827,003 | 3/1958 | Stetson | 49/1 |
| 2,910,290 | 10/1959 | Buchanan | 49/30 |
| 3,660,637 | 5/1972 | Grove | 219/413 |
| 4,090,437 | 5/1978 | Bogaert | 49/1 |
| 4,189,632 | 2/1980 | Swanson et al. | 219/391 |

Primary Examiner—B. A. Reynolds
Assistant Examiner—Bernard Roskoski
Attorney, Agent, or Firm—George R. Clark; Neil M. Rose; Robert J. Fox

[57] ABSTRACT

A door opening mechanism for partially opening a door on a toaster oven wherein the oven includes a thermal timer for controlling the operation of the oven in a toast mode. The door opening mechanism includes a first lever held in a first position by the timer wherein the first lever is released upon termination of the toast mode. The mechanism further includes a resiliently biased slide held in a first position by the first lever and released to a second position upon completion of the toast mode. The slide is mechanically coupled to a lever assembly that includes second and third levers and a cam lever. The third lever and the cam lever are mechanically coupled to the oven door and are resiliently held in a first position to hold the door closed and resiliently moved to a second, door open position upon release of the first lever. The mechanism turns the mode selector switch to the off position once the toast has been removed from the oven and the door closed.

5 Claims, 30 Drawing Figures

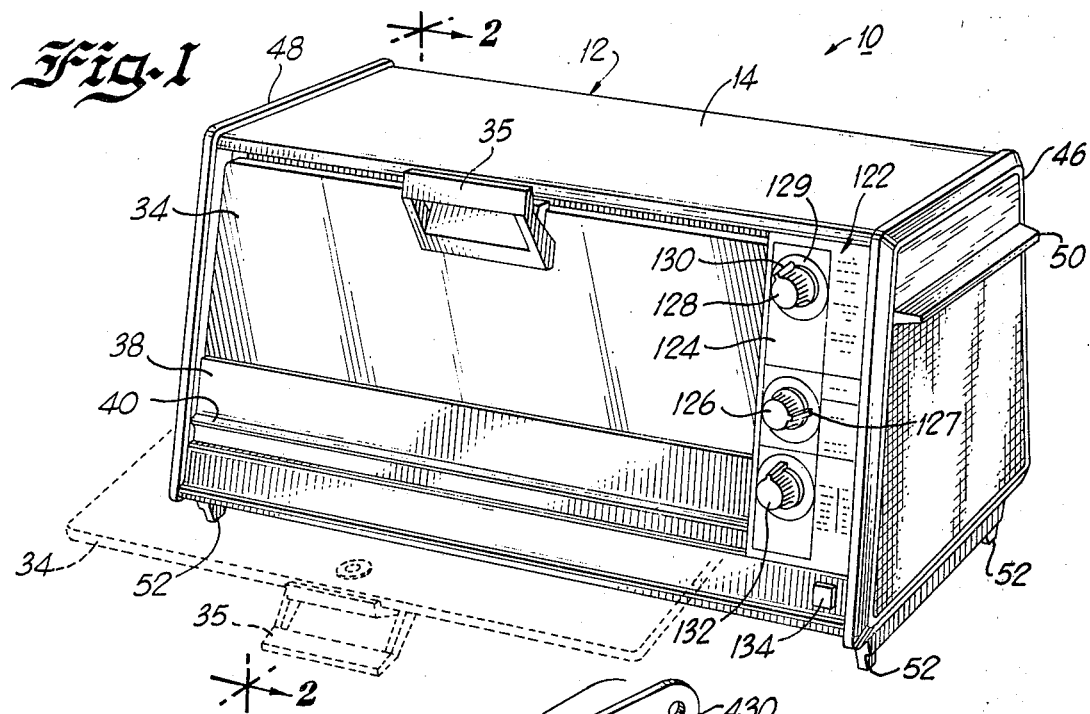
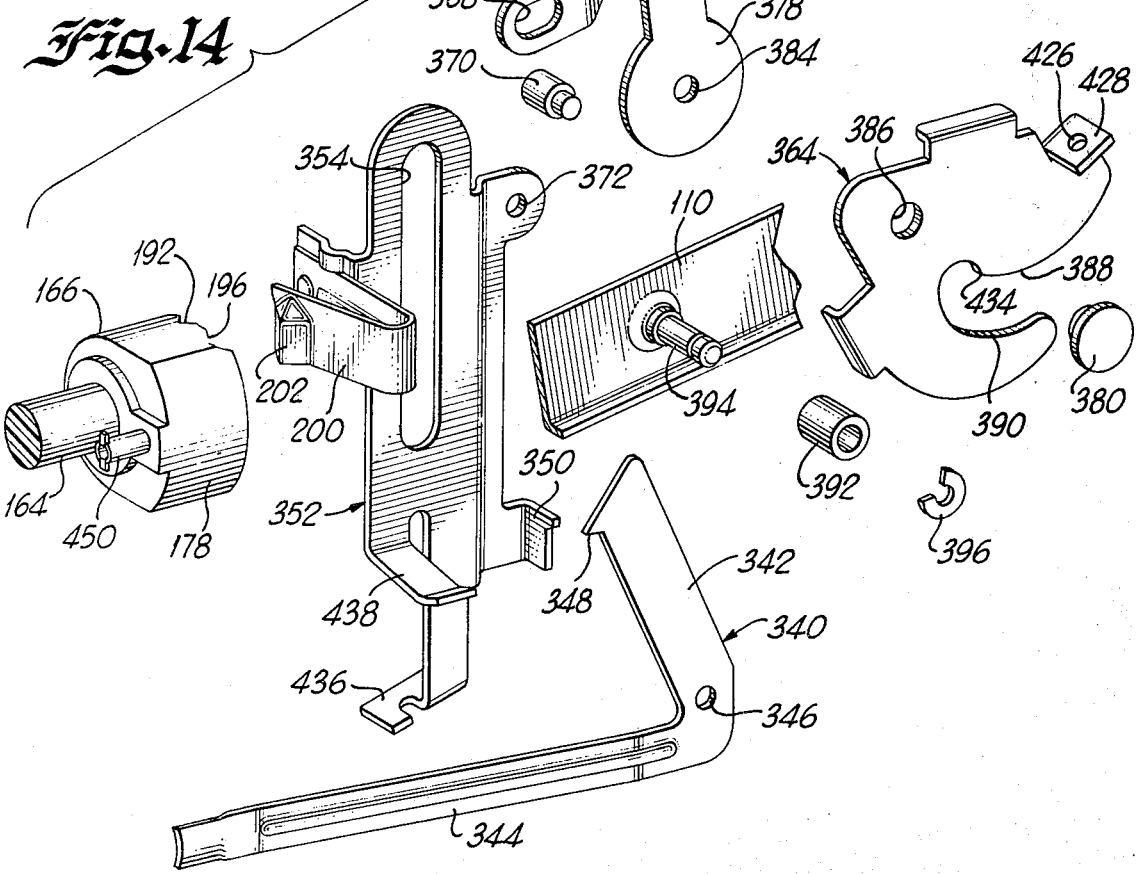

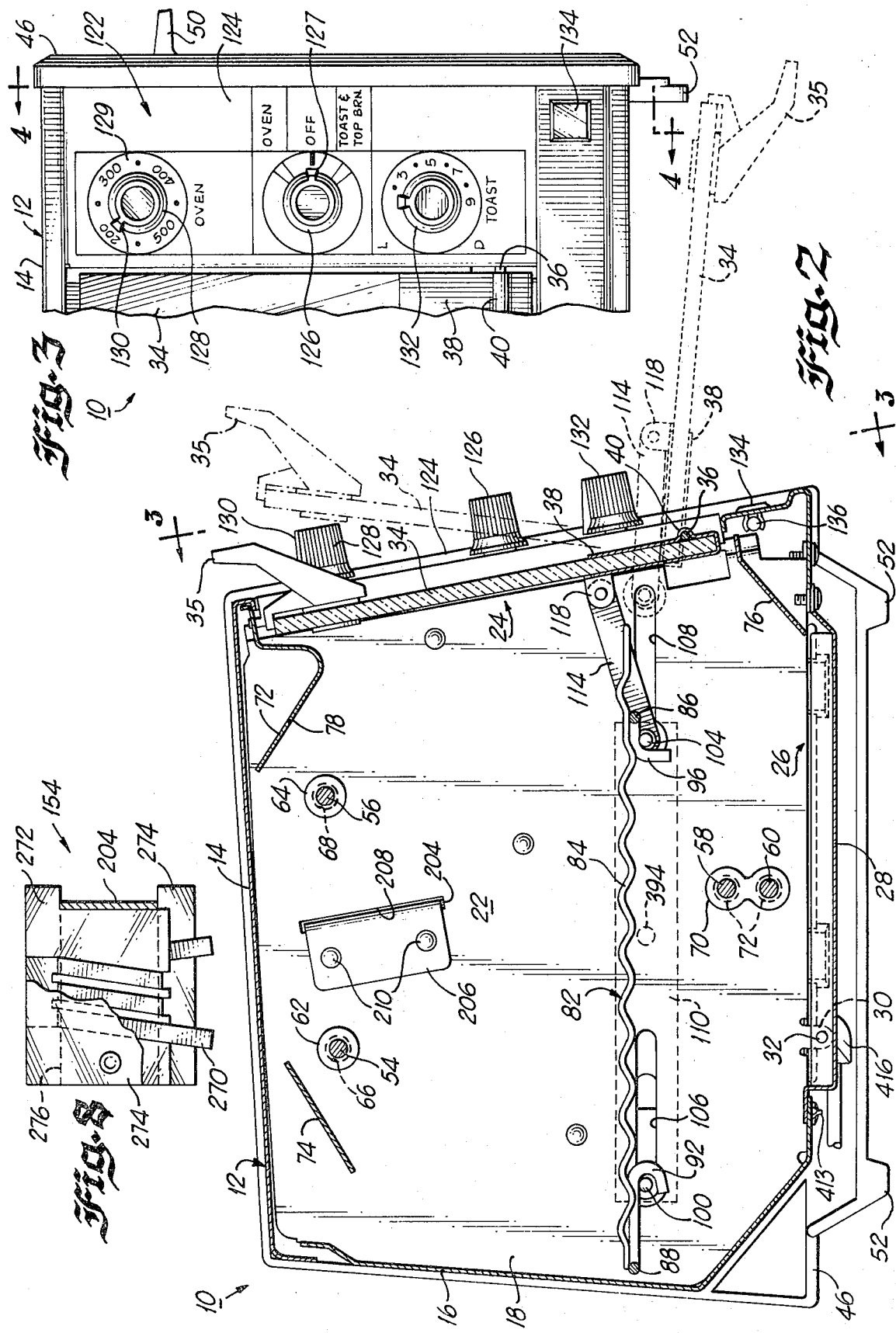

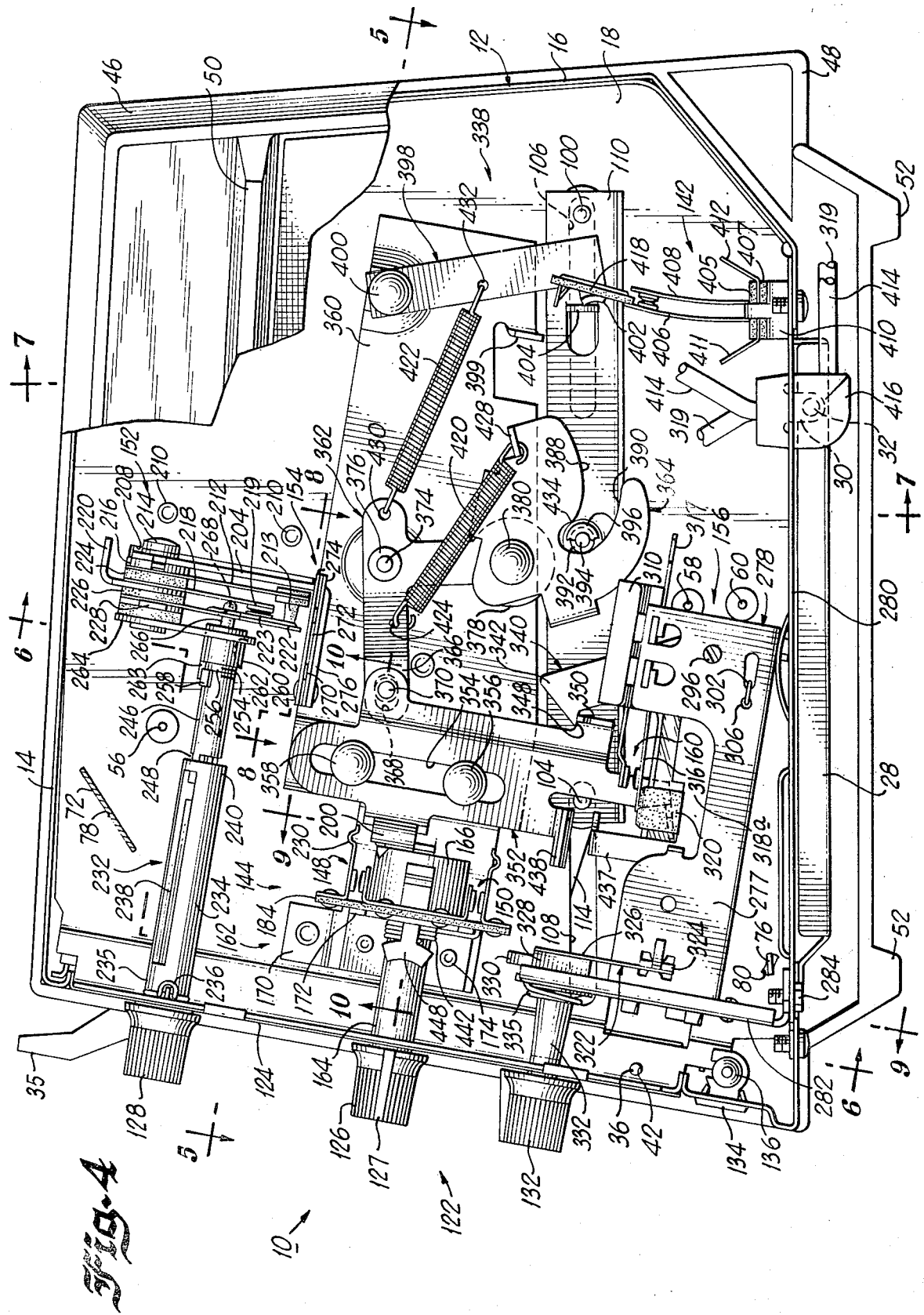

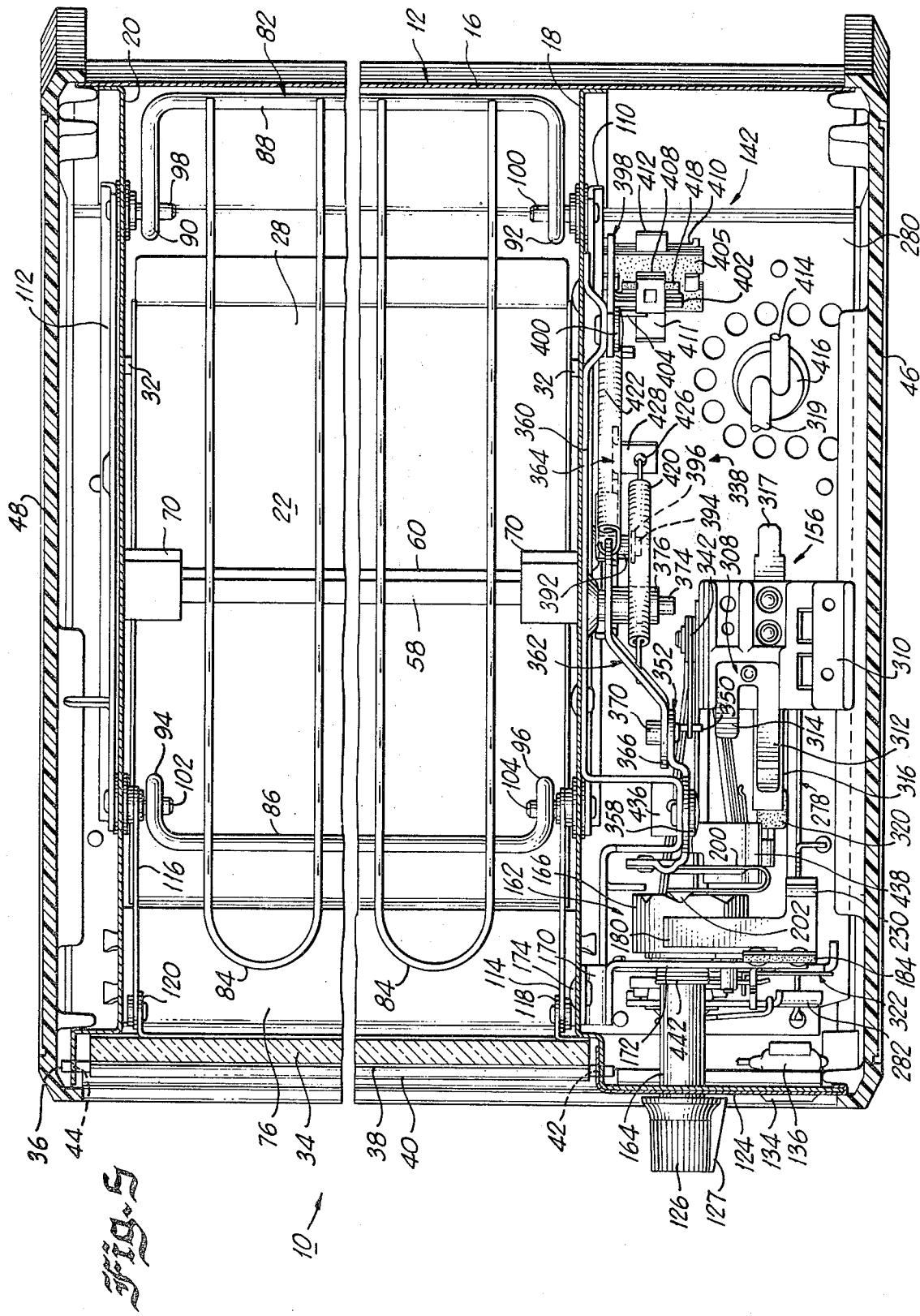

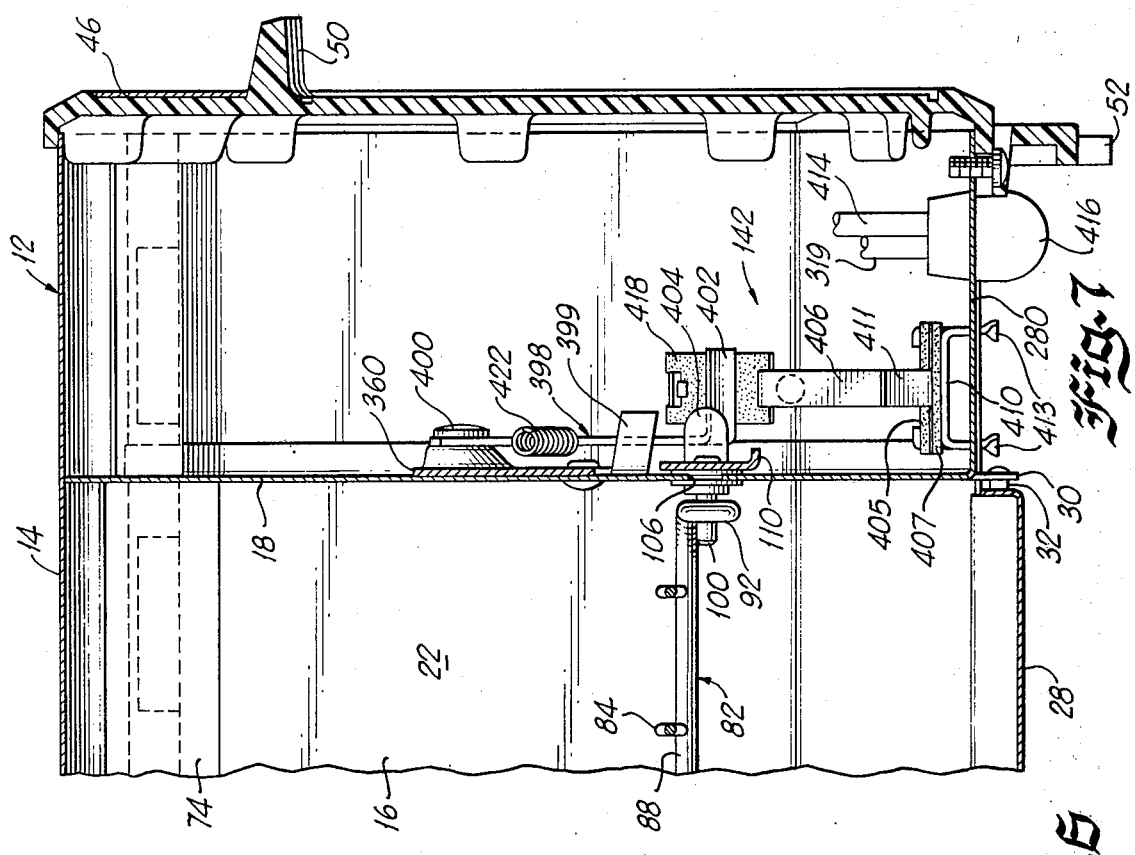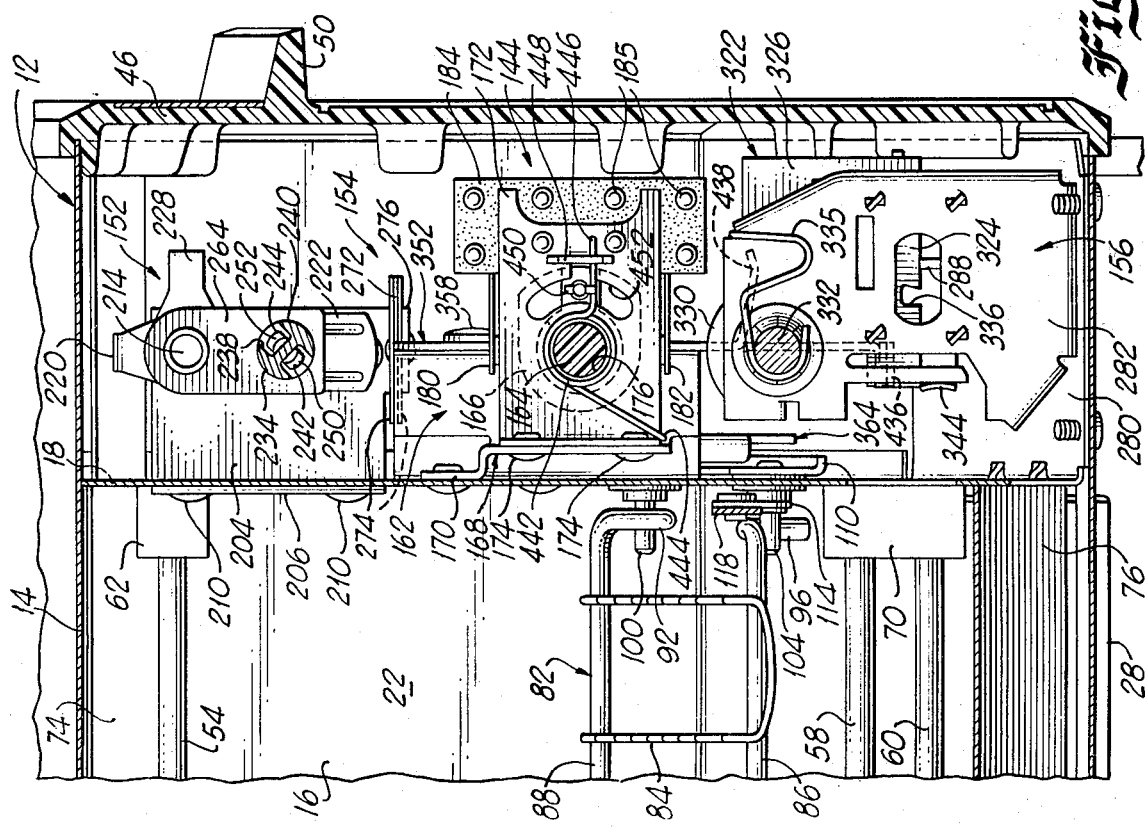

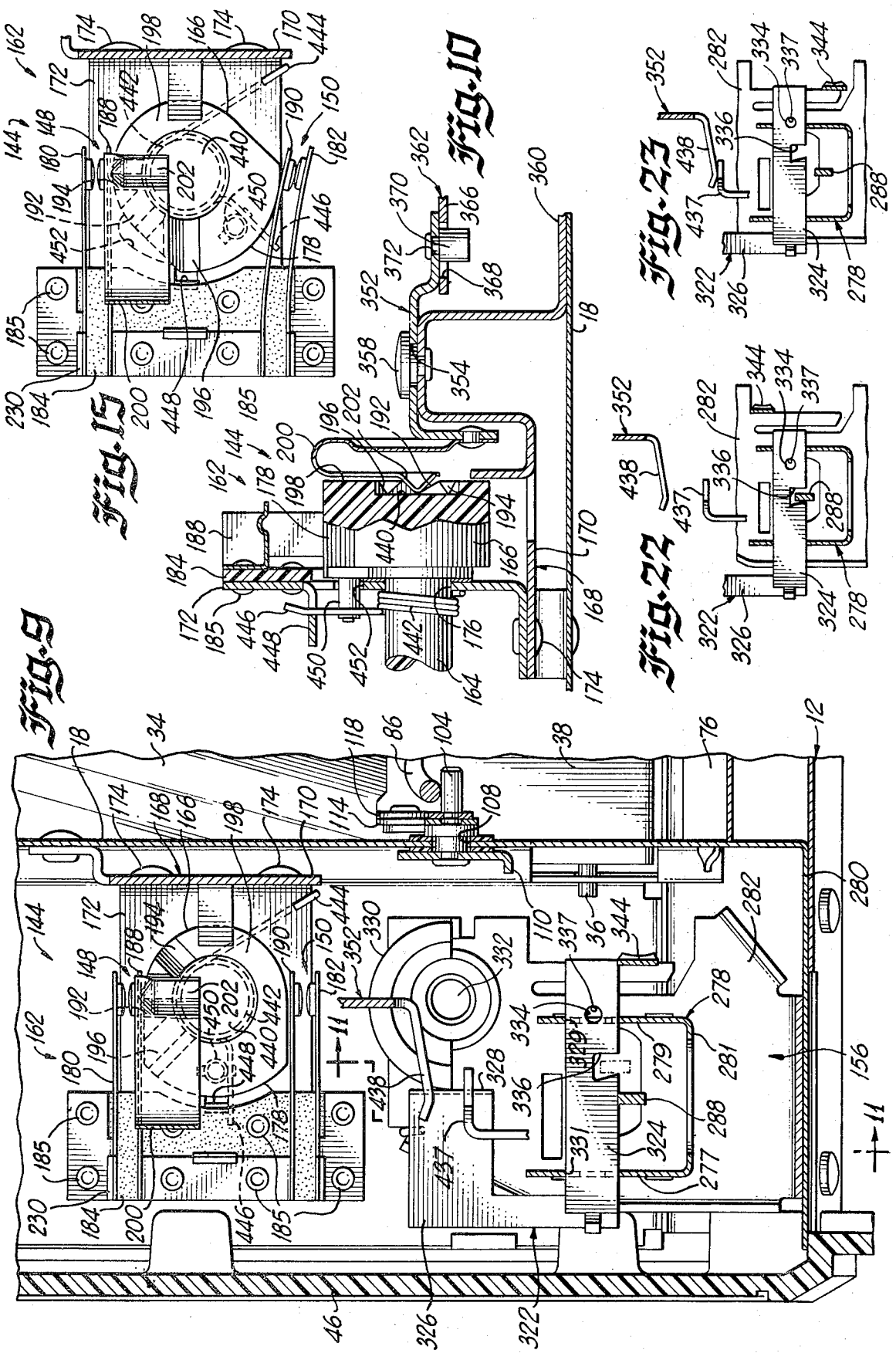

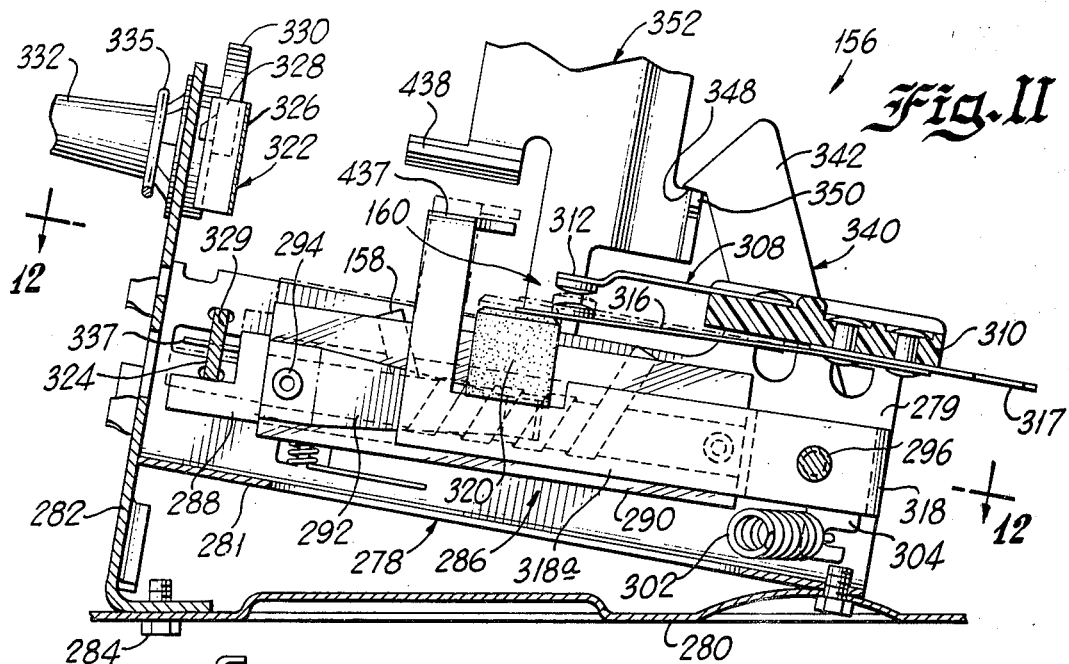
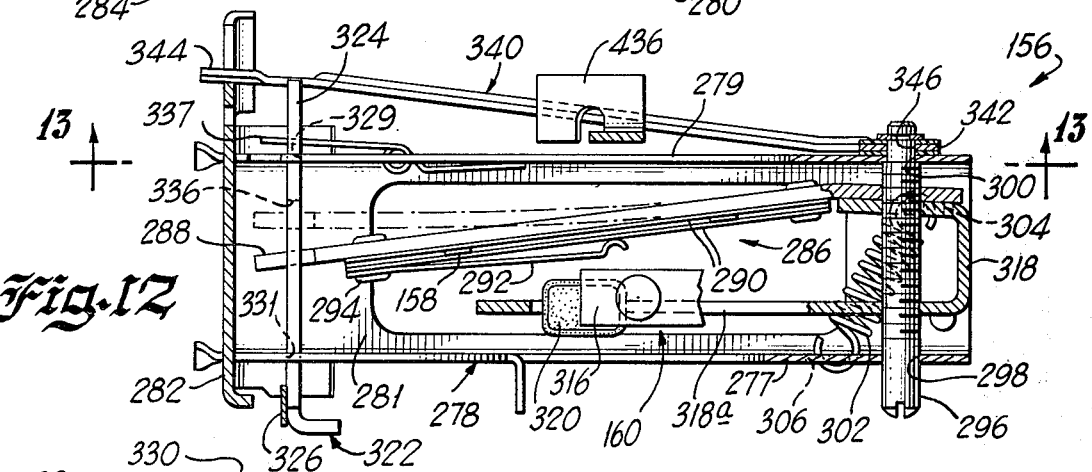
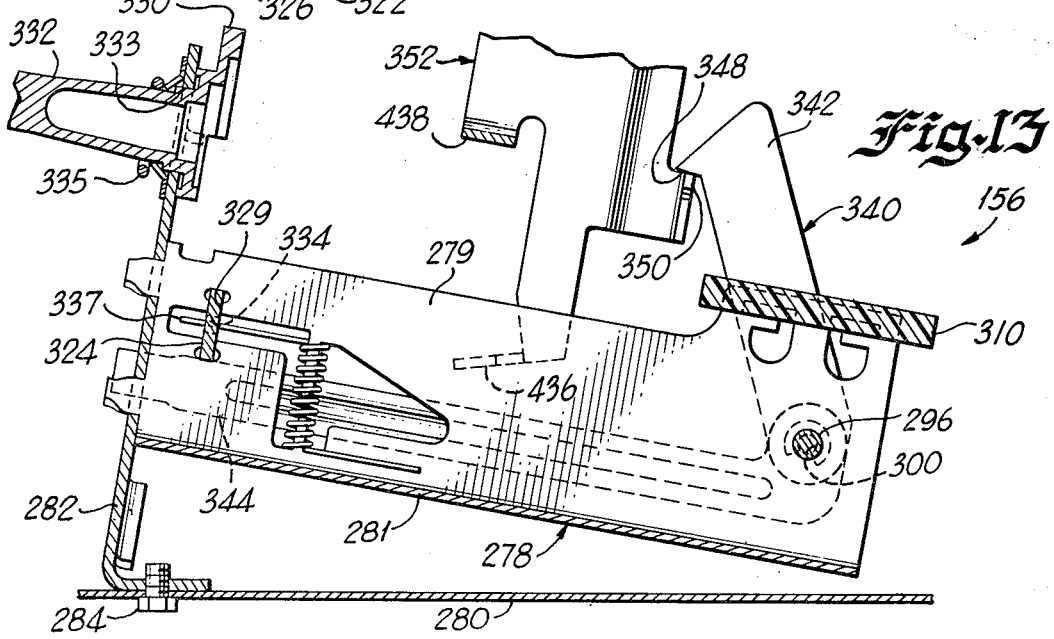

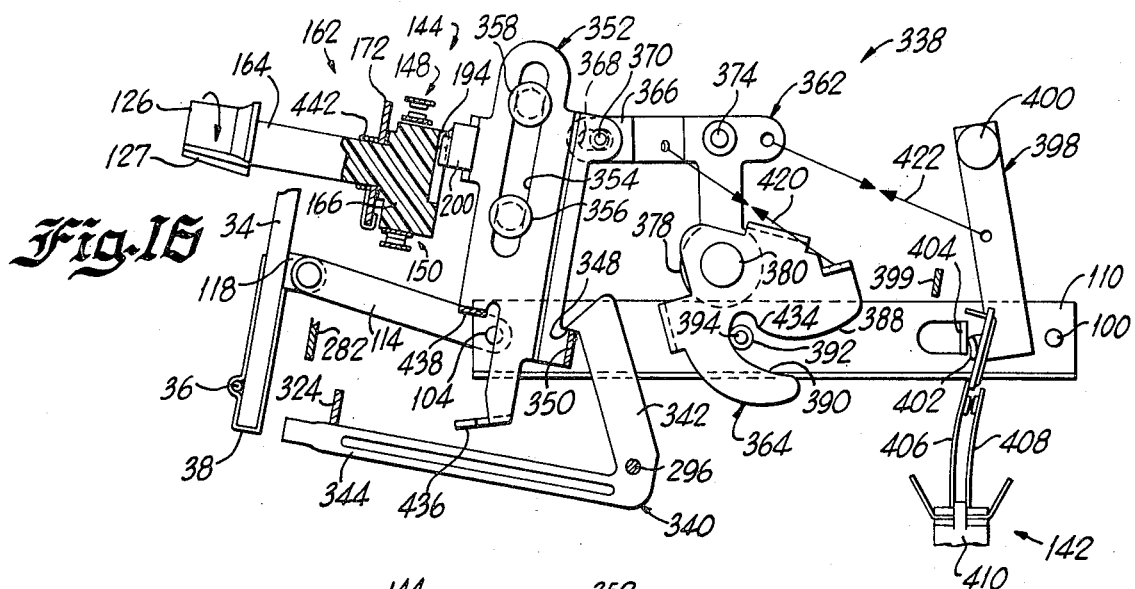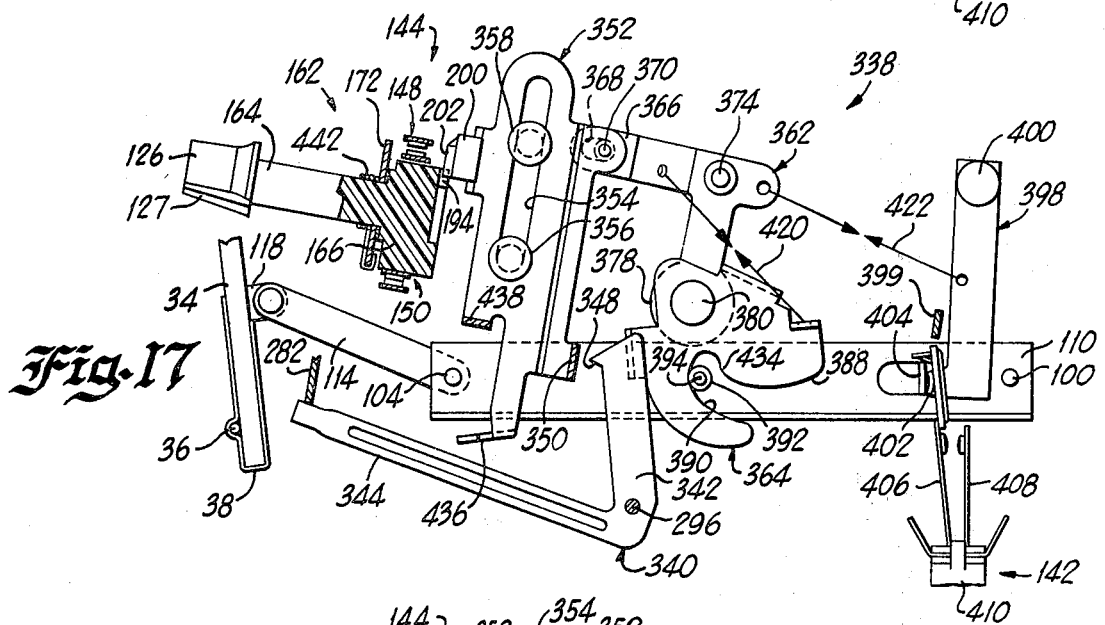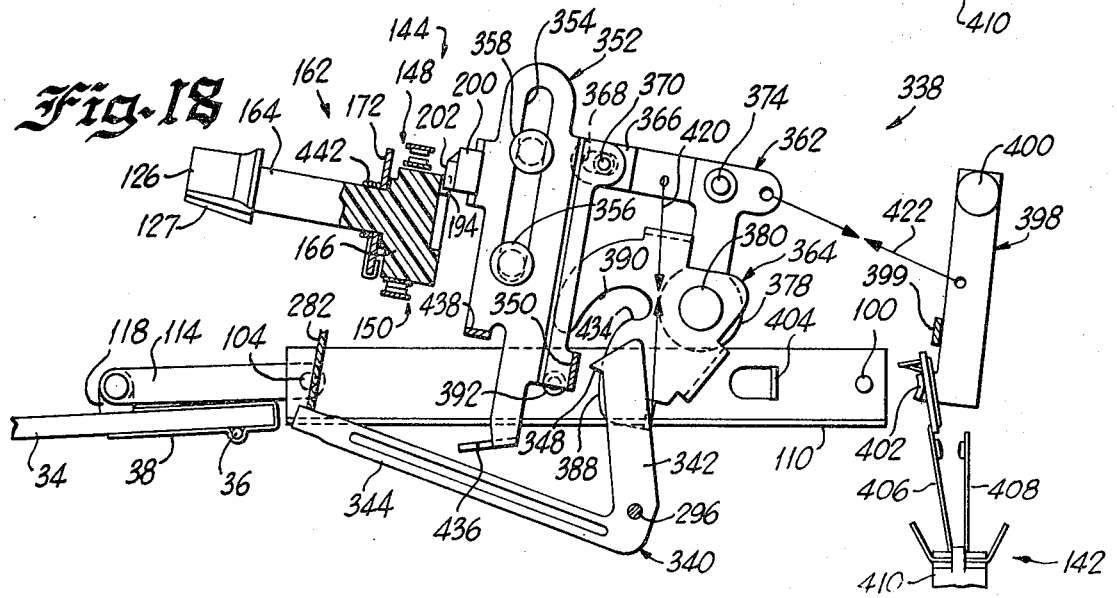

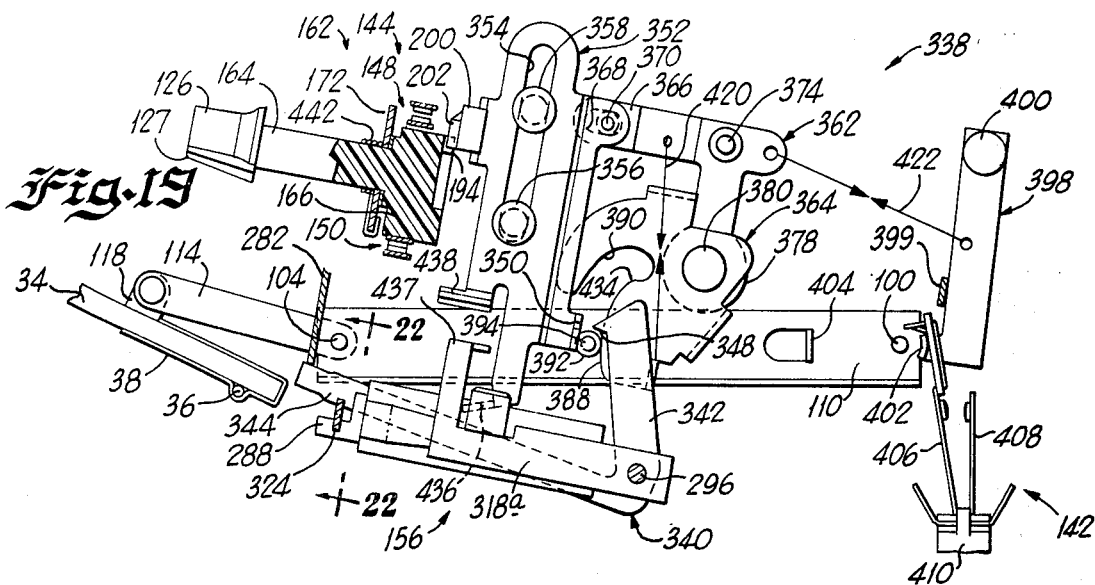
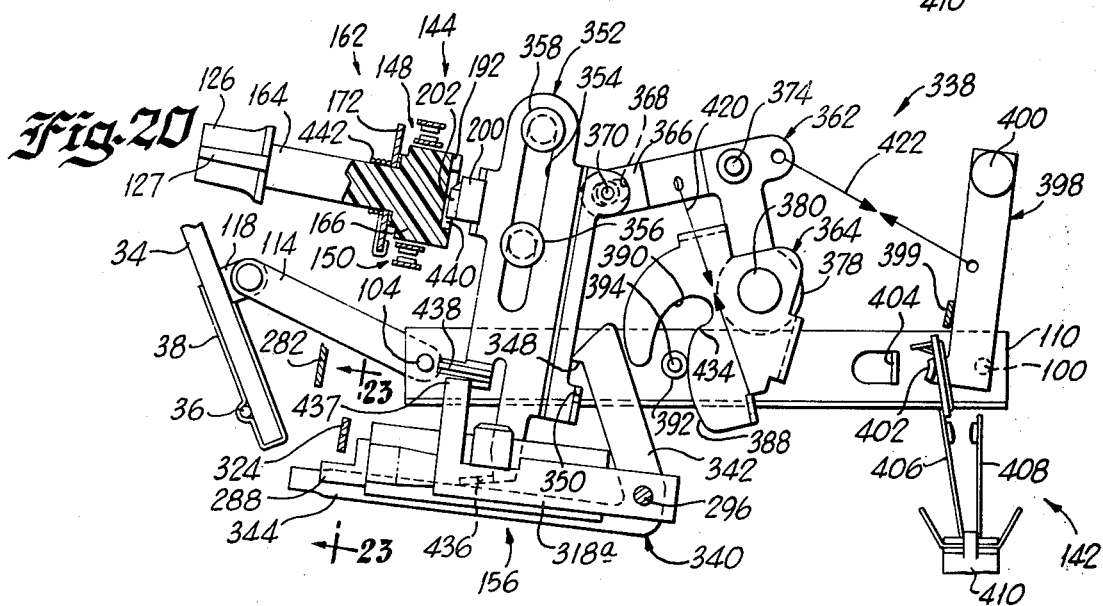
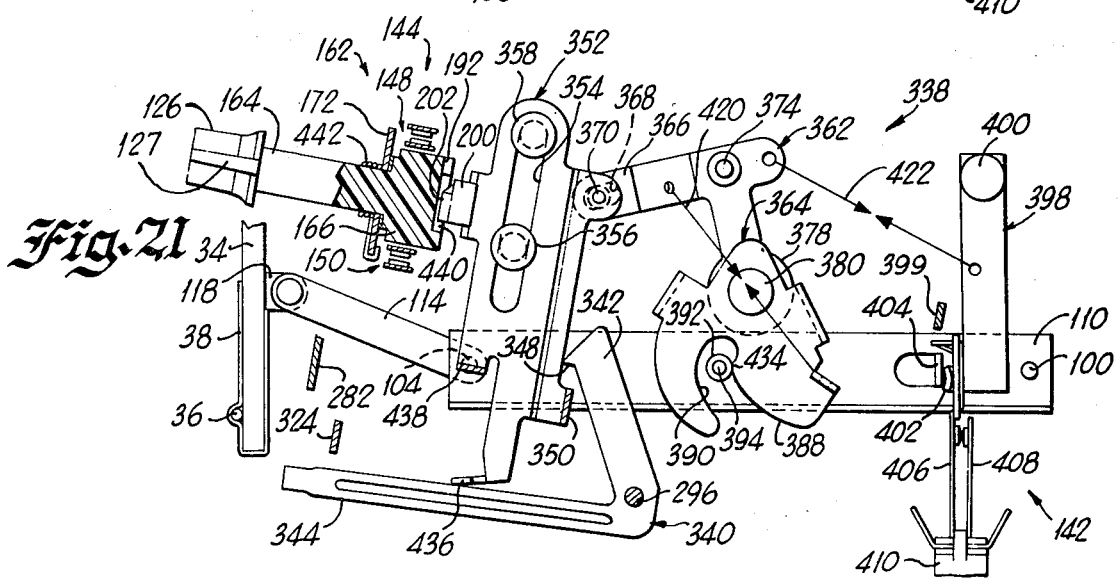

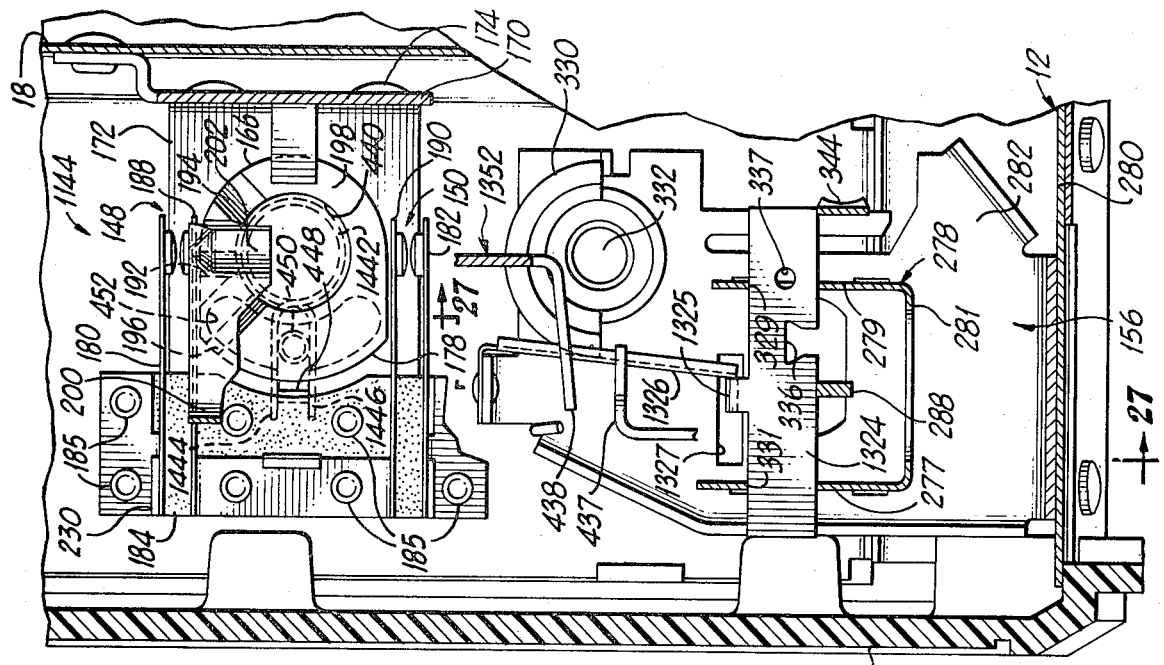
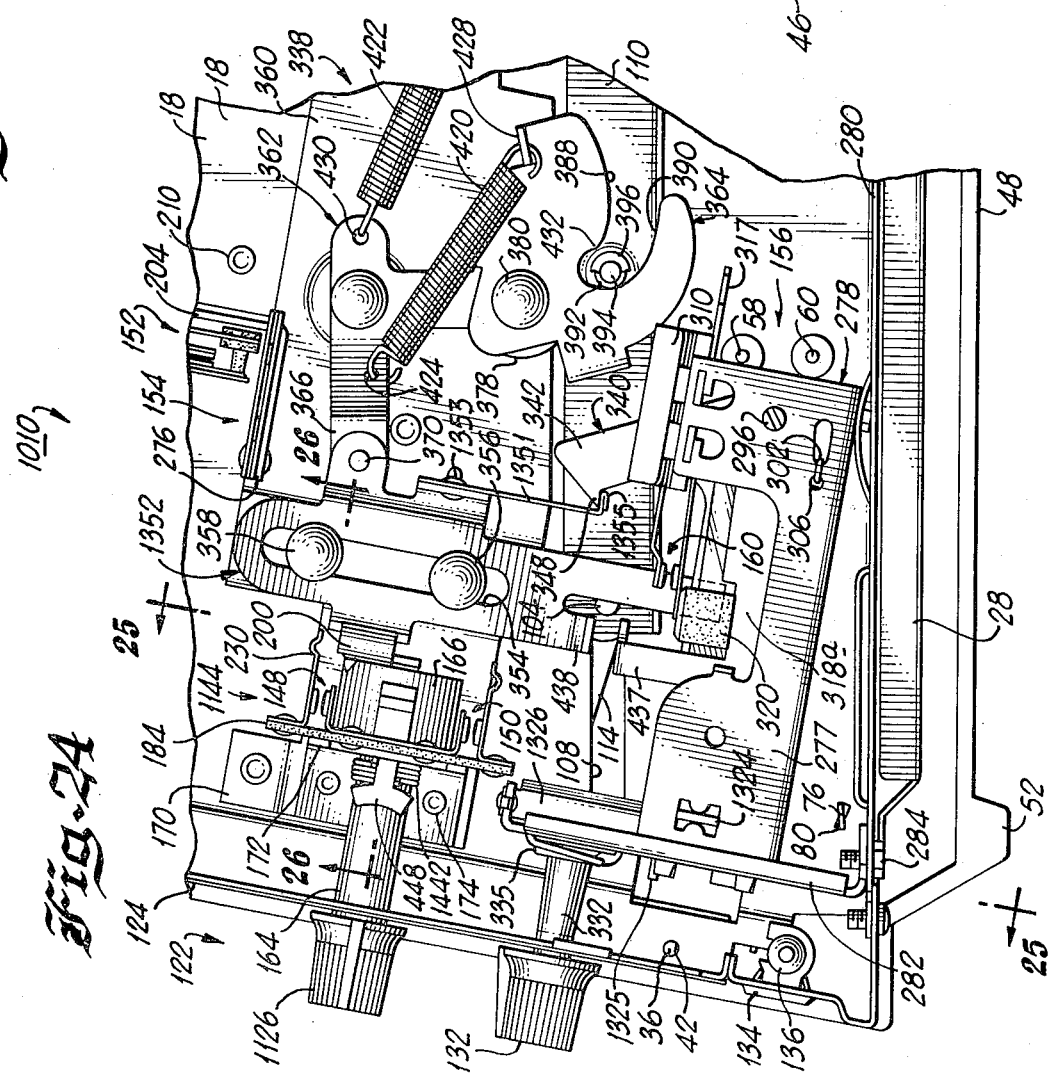

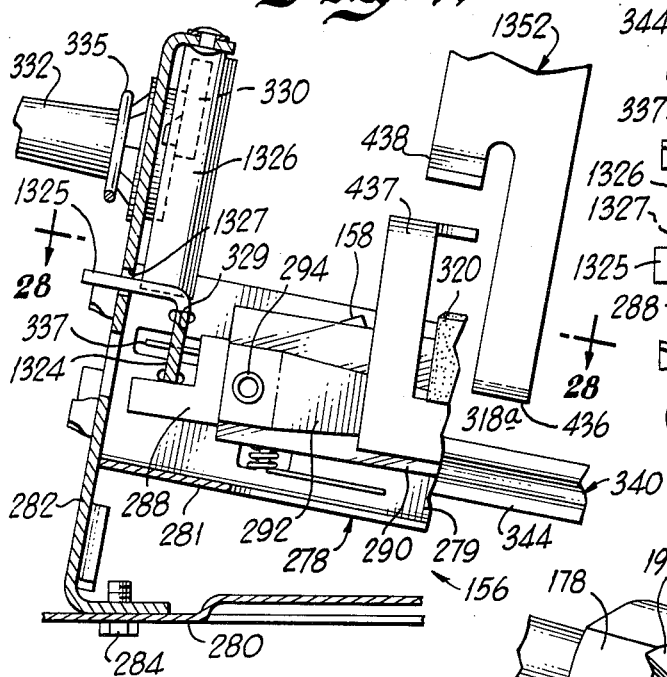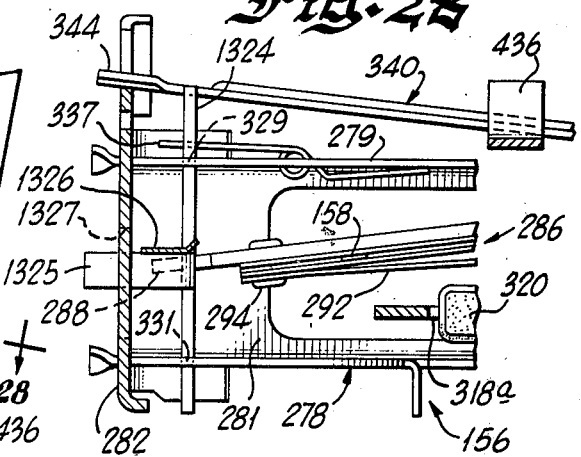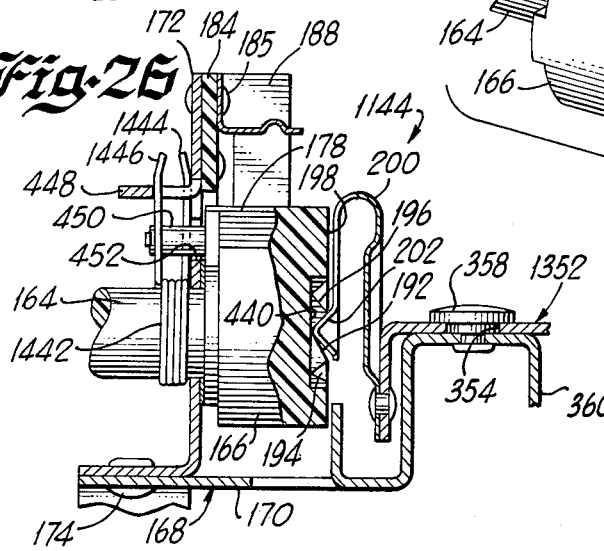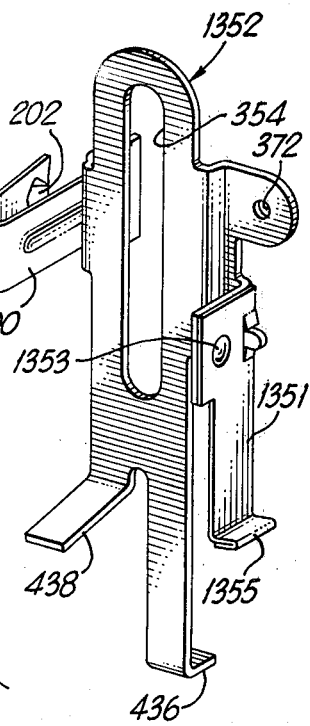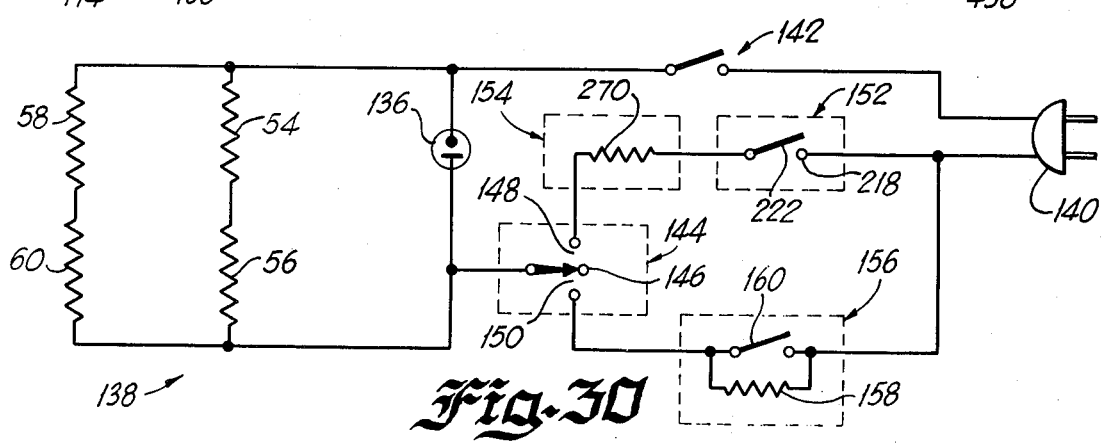

DOOR OPENING MECHANISM FOR PARTIALLY OPENING A TOASTER OVEN DOOR

This is a division of application Ser. No. 750,367, filed Dec. 13, 1976, now U.S. Pat. No. 4,189,632.

BACKGROUND OF THE INVENTION

A. Field of the Invention

The present invention relates to door opening mechanisms for toaster ovens of the type employed to cook various foods or to toast bread.

B. Description of the Prior Art

A typical toaster oven employed to cook foods or toast bread generally includes a housing defining an oven chamber the access to which is provided by a door hinged on the front of the housing. The oven chamber also includes a rack upon which the food or toast may be placed. The food or toast is heated by one or more heating elements mounted within the oven chamber that interact with several reflectors positioned at various locations within the oven chamber. A typical prior art toaster oven is disclosed in the U.S. Pat. No. 3,693,538 Snyder.

Prior art toaster ovens typically include an oven thermostat for controlling the energization of the heating elements during the oven mode of operation, and a timer for controlling the length of energization of the heating elements during the toaster mode of operation thus allowing for accurate control of the preparation of the food. A typical toaster oven including an oven thermostat and timer is disclosed in U.S. Pat. No. 3,684,861 De Remer.

It has been discovered that after the food or bread has been heated to the proper temperature and cooked or toasted and the heating elements are deenergized, the heat within the oven chamber may not dissipate soon enough to prevent over-cooking or further toasting prior to removal of the food or toast from the oven chamber. One method of correcting this problem, particularly during the toast cycle, is to automatically open the oven door upon completion of the cycle of operation. This allows hot air to escape from the oven chamber thereby rapidly reducing the temperature of the oven chamber and preventing over-toasting. A typical prior art mechanism for opening the oven door at completion of the toasting cycle is illustrated in U.S. Pat. No. 3,658,050 Snyder.

These prior art toaster ovens, and specifically the automatic door arrangements, often suffer from lack of reliability due to the fact that the mechanisms fail to operate at the proper time during the toaster mode of operation. In addition, these devices often include timers or electrical switches that require extensive servicing.

SUMMARY OF THE INVENTION

An object of the present invention is to provide a new and improved door opening mechanism for automatically opening the door of a toaster oven at the completion of the toasting cycle.

Another object of the present invention is to provide an improved device for returning the toaster oven to its off-mode once the door has been completely opened and closed at the completion of a toasting cycle.

A further object of the present invention is to provide a new and improved door actuating mechanism for reliably opening the door on a toaster oven at the completion of the toasting cycle.

In brief, the above and other objects and advantages of the present invention are achieved by providing an improved door actuating mechanism that includes a resiliently biased rack actuating lever and a pallet connected to a food rack mounted in the oven chamber of the toaster oven. The rack, in turn, is connected to the door of the toaster oven.

The rack actuating lever and pallet are resiliently connected to a slide assembly that is latched in a door closed position by a capturing lever. The capturing lever is controlled by a thermal timer mounted within the housing of the toaster oven. The thermal timer is adjusted by a knob on the exterior of the oven housing to control the duration of the toasting cycle. At the completion of the toasting cycle, the thermal timer releases the slide assembly allowing the lever and pallet to open the door under the influence of the resilient bias.

The toaster oven further includes a spring assembly that deenergizes the oven once the door has been completely opened after the toasting cycle and automatically turns the toaster oven off once the door is reclosed, thus providing the toaster oven with the safety feature of deenergizing and turning off the oven when not in use.

BRIEF DESCRIPTION OF THE DRAWINGS

The present invention together with the above and other objects and advantages will best appear from the following description of the illustrative embodiments of the invention shown in the accompanying drawings, wherein:

FIG. 1 is a perspective view of a toaster oven embodying the present invention,

FIG. 2 is a cross-sectional view of the toaster oven taken along the line 2—2 in FIG. 1, FIG. 3 is a partial cut-away view of the front face of the toaster oven taken along the line 3—3 of FIG. 2, FIG. 4 is an enlarged view of the door opening mechanism taken along line 4—4 in FIG. 3, FIG. 5 is a cross-sectional view of the toaster oven and a door opening mechanism constructed in accordance with the principles of the present invention taken along line 5—5 in FIG. 4, FIG. 6 is a fragmentary sectional view taken along line 6—6 in FIG. 4, FIG. 7 is a fragmentary sectional view taken along line 7—7 in FIG. 4, FIG. 8 is a fragmentary sectional view of a portion of the toaster oven taken along line 8—8 in FIG. 4, FIG. 9 is a fragmentary sectional view of the knob assembly for the toaster oven taken along line 9—9 in FIG. 4, FIG. 10 is a fragmentary sectional view of the mode selector switch of the toaster oven taken along line 10—10 in FIG. 4, FIG. 11 is a fragmentary sectional view showing the thermal timer in the toaster oven taken along line 11—11 in FIG. 9, FIG. 12 is a sectional view taken along line 12—12 in FIG. 11, FIG. 13 is a sectional view taken along line 13—13 in FIG. 12, FIG. 14 is an exploded perspective view of the door opening mechanism, FIG. 15 is a view of the mode switch on the toaster oven in the toast mode position, FIG. 16 is a diagrammatic illustration of the door opening mechanism in a door closed position, FIG. 17 is a diagrammatic illustration of the door opening mechanism in a partially opened configuration, FIG. 18 is a diagrammatic illustration of the door opening mechanism in the door open position, FIG. 19 is a diagrammatic illustration of the door opening mechanism in a closing position, FIG. 20 is a diagrammatic illustration of the door opening mechanism wherein the mode switch is moved to the off position, FIG. 21 is a diagrammatic illustration of the door opening mechanism in an almost completely closed position, FIG. 22 is a fragmentary sectional view taken along line 22—22 of FIG. 14 but showing the door opening mechanism in the door closed position, FIG. 23 is a fragmentary sectional view taken along line 23—23 of FIG. 20 showing the door opening mechanism illustrated in FIG. 22 during the door opening operation, FIG. 24 is a side view of an alternative embodiment of a door opening mechanism constructed in accordance with the principles of the present invention, FIG. 25 is a sectional view taken along line 25—25 of FIG. 24, FIG. 26 is a fragmentary sectional view taken along line 26—26 in FIG. 24, FIG. 27 is a fragmentary sectional view taken along line 27—27 in FIG. 25, FIG. 28 is a sectional view taken along line 28—28 of FIG. 27, FIG. 29 is an exploded perspective view of a mode switch cam and reset slide of the alternate embodiment, and FIG. 30 is a schematic illustration of the electrical circuit for the toaster oven constructed in accordance with the principles of the present invention.

DESCRIPTION OF THE PREFERRED EMBODIMENTS

Having reference now to the drawings, and initially to FIGS. 1-5, there is illustrated a toaster oven designated as a whole by reference numeral 10. The toaster oven 10 may be employed to cook foods or toast bread.

The toaster oven 10 is defined by a housing generally designated as 12 that includes an upper shell 14, and a rear shell 16. The longitudinal ends of the shells 14 and 16 are closed by a pair of liners 18 and 20. The shells 14 and 16 and the liners 18 and 20 define an oven chamber 22 having an open front 24 and bottom 26. To capture crumbs or particles of food during cooking or toasting, the bottom 26 of the chamber 22 is closed by a movable crumb tray 28. The crumb tray 28 is secured by a tab 30 to a hinge pin 32 thereby allowing the tray 28 to be rotated about the pin 32 to remove accumulated crumbs.

In order to provide access to the chamber 22 for the insertion or removal of food or bread, the front 24 of the chamber 22 includes a glass door 34 that is pivoted about a hinge pin 36 to close and open the front 24. The door 34 includes a sleeve 38 that is secured to the bottom of the door 34. The sleeve 38 includes a formed channel 40 for the insertion of the hinge pin 36 thereby coupling the door 34 to the hinge pin 36. The hinge pin 36 is mounted at each end into apertures 42 and 44 (FIG. 5) fabricated in the liners 18 and 20 respectively, thereby pivotally securing the door 34 to the housing 12. The door 34 also includes a handle 35 secured thereto to allow an individual to pivot the door 34 about the pin 36.

To enclose the housing 12 and the controls, to be described hereinafter, in a decorative manner, there are secured to the liners 18 and 20 molded side panels 46 and 48. The panels 46 and 48 are of a heat resistive and insulative material and include molded handles 50 to allow easy carrying of the oven 10. A plurality of molded legs 52 on which the oven 10 is supported are also provided.

For the purpose of cooking food or toasting bread placed in the chamber 22, the toaster oven 10 includes a pair of upper heating elements 54 and 56 and a pair of lower heating elements 58 and 60. The ends of the upper heating elements 54 and 56 are mounted at one end in insulators 62 and 64, respectively, that in turn are mounted in apertures 66 and 68, respectively, fabricated in the liner 18. The ends of the lower heating elements 58 and 60 are mounted in an insulator 70 that in turn is mounted in apertures 72 fabricated in the liner 18. The opposite ends of the heating elements 54, 56, 58 and 60 are mounted in liner 20 in a similar fashion.

To increase the efficiency of the toaster oven 10, the radiant heat developed by the heating elements 54, 56, 58, and 60 is reflected to a specific area within the oven chamber 22 preferably that area in the chamber 22 at which food to be cooked will be located. These include a front reflector strap 72, a rear reflector strap 74 and a lower reflector strap 76 that are mounted within the chamber 22. One end of the front reflector strap 72 extends into a slot 78 (FIG. 4) fabricated in liner 18 and is bent to secure the strap 72 to the liner 18. The opposite end of the strap 72 is secured to the liner 20 in a similar manner. Similarly, the lower reflector strap 76 is secured in slot 80 in liner 18 and a similar slot (not shown) in liner 20. Moreover, rear reflector strap 74 is secured to the liners 18 and 20 in a similar manner. In this configuration, the straps 72, 74 and 76 serve to position liners 18 and 20 relative to each other and lend rigidity to the housing 12. In addition, the front reflector 72 and rear reflector 74 straps are secured at their ends to the side panels 46 and 48 thereby positioning the panels 46 and 48 relative to each other and the housing 12.

Food or bread that is to be cooked or toasted in the toaster oven 10 is positioned in the chamber 22 on a wire rack 82. The rack 82 includes a plurality of longitudinally extending wires 84 for supporting the food or bread and also includes front 86 and a rear 88 transversely extending support wires. The ends of the support wire 88 are bent into loops 90 and 92, and wire 86 is bent into loops 94 and 96 such that, in the assembled configuration, each of the loops 90, 92, 94 and 96 may be mounted upon a support stud 98, 100, 102, and 104, respectively. Each of the support studs 102 and 104 extends through a slot 106 and 108, respectively, in the liner 18 and is secured to a rack bracket 110 (FIG. 4) positioned on the opposite side of the liner 18. In a similar manner studs 98 and 102 are secured to a rack bracket 112 positioned adjacent the liner 20.

To allow easy access to the rack 82 for the placement of food or bread thereon, and, as to be described below, to provide the motive connection for automatically opening the door 34 at the completion of the toasting cycle of the toaster oven 10; the rack 82 is connected to the door 34 by links 114 and 116. One end of each of the links 114 and 116 is connected to the rack by a connection to a support stud 104 and 102, respectively. The other ends of the links 114 and 116 are connected by rivets to a tab 118 and 120, respectively, fabricated on the door sleeve 38. The ends of the links 114 and 116 are mounted so as to allow them to pivot around their points of connection. Accordingly, as the door 34 is opened the rack 82 is simultaneously pulled toward the front 24 of the chamber 22. In addition, as a result of the connection of rack 82 to the support studs 98, 100, 102, and 104, the rack brackets 110 and 112 are also moved forward toward the front 24 of the toaster oven 10.

In order to provide an operator with easy control of the toaster oven 10, there is provided a knob assembly 122 mounted on the front plate 124 of the toaster oven 10. The assembly 122 allows control of the mode of operation of the toaster oven 10 as well as the temperature setting or time of operation in the toasting mode. For example, the toaster oven 10 can be operated in the oven mode at a set temperature to cook foods. To accomplish this operation, the knob assembly 122 includes a mode knob 126 that controls a mode switch to be described hereinafter. The knob 126 includes a pointer 127. The knob 126 can be rotated to position the pointer 127 adjacent the "off", "oven" or "toast" indicia on the front plate 124 adjacent the knob 126. This actuation of the knob 126 operates a mode switch, to be described hereinafter, to energize the toaster oven 10 in the manner selected. In the oven mode, control of the temperature in the chamber 22 is provided by an oven thermostat, to be described hereinafter, the temperature level of which is set by the knob 128 in the assembly 122. The temperature in the chamber 22 may be selected by positioning a pointer 130 on the knob 128 adjacent the temperature designation 129 printed on the front plate 124 adjacent the knob 128.

If the knob 126 were moved to the toast position, the time of operation of this mode to insure proper toasting of the bread may be selected by the selection knob 132. The knob 132 actuates a thermal timer, to be described hereinafter, to control the time of energization of the heating elements 54, 56, 58 and 60.

In order to alert the operator of the toaster oven 10 that the heating elements 54, 56, 58, and 60 are energized, there is a lens 134 mounted on the front of the toaster oven 10 adjacent a pilot light 136 secured to the back thereof. The bulb 136 is energized whenever the knob 126 is rotated to either the oven or toast modes and the elements 54, 56, 58, and 60 are energized.

Electrical Circuit

The purpose of the toaster oven 10 is to cook food or to toast bread that is placed in the chamber 22. This is accomplished by controlled energization of the heating elements 54, 56, 58 and 60. The circuitry, generally designated as 138, for accomplishing these functions is schematically illustrated in FIG. 30. The circuit 138 is connected to an appropriate AC source by plug 140. Energization of the heating elements 54, 56, 58 and 60, once the plug 140 is connected to an AC source, is initially controlled by the line switch 142. The line switch 142 is connected to the door 34 in a manner such that the switch 142 is only closed when the door 34 is also closed.

Once the door 34 is closed, the other half of the circuit 138 is controlled by the mode switch 144. The mode switch 144 can be moved by the knob 126 (FIG. 3) to either the "off" position 146, the "oven" position 148, or the "toast" position 150. In the "off" position 146, the circuit 138 is not completed and the heating elements 54, 56, 58 and 60 are not energized. In the "oven" position 148, the circuit 138 is completed through an oven thermostat 152 and an anticipator heater 154. The thermostat 152 cycles open and close in response to the sensed temperature in the chamber 22 and the heat generated by the heater 154 thereby alternately energizing the heating elements 54, 56, 58 and 60 to maintain the temperature in the chamber 22 at the level selected by the knob 128 (FIG. 3).

When the mode switch 144 is moved to the "toast" position 150, the thermostat 152 and heater 154 are disconnected and a thermal timer 156 is connected to the AC source. The timer 156 includes a bimetal heater 158 and a shorting switch 160. The cycle time of the heater 158 and the heating elements 54, 56, 58 and 60 is a function of the heat up deflection time and the cool off time of the switch 160 which is controlled by the position of the knob 132. After expiration of the selected period, the shorting switch 160 is closed thereby shorting out the heater 158.

In addition, whenever the circuit 138 is completed in either the oven or toast mode, pilot light 136 is energized thus warning the user of the condition of the toaster oven 10.

Mode Switch

The mode switch 144 is actuated by the knob 126 to switch the toaster oven 10 from the off mode into either of the oven or toast modes. This function is accomplished through the employment of the mode switch assembly generally designated as 162 (FIG. 4). The mode switch assembly 162 includes an armature 164 secured at one end to the knob 126 and at the other end to a molded positioning cam 166. The armature 164 is mounted within the toaster oven 10 on a support arrangement 168 (FIG. 6) that includes a base 170 secured to the liner 18 and an L-shaped support 172 secured to the base 170 by rivets 174. The support 172 includes an aperture 176 through which extends the armature 164 thus being supported.

The cam 166 is rotated by the knob 126 and serves to actuate the oven and toast switches 148 and 150, respectively, by the cam surface 178 defined on the cam 166 (FIGS. 9 and 15). The switches 148 and 150 each includes a blade 180 and 182, respectively, that is secured to an insulation block 184. The insulation block 184 is secured to the support 172 by a plurality of rivets 185. The blade 180, in turn, is electrically connected to the anticipator heater 154 and the oven thermostat 152. The blade 182 is electrically connected to the thermal timer 156. Each switch 148 and 150 also includes a second, movable blade 188 and 190, respectively, that may be engaged and moved by the cam surface 178 of the cam 166 to close the respective switch 148 or 150 and thereby actuate the heating elements 54, 56, 58 and 60 in the respective mode and through either the thermostat 152 or the timer 156.

To capture and hold the mode switch 144 in the different modes, the cam 166 includes three notches 192, 194, and 196 fabricated on its face 198 (FIG. 10). To retain the switch 144 in the selected mode, there is also provided a spring follower 200 that includes a detent portion 202 that may be positioned in one of the notches 192, 194 or 196. Accordingly, in the off mode the detent 202 of the follower 200 is positioned in notch 192 maintaining the switch 144 in the off mode. If the operator desires to cook food, the knob 126 is rotated to the oven position and the cam 166 is also rotated forcing the detent 202 out of notch 192 against the resilient bias of the follower 200. The notch 194 is moved to a point adjacent the detent 202 whereupon the detent 202 snaps into the notch 194 maintaining the switch 144 in that position. A similar procedure is followed to position the detent 202 in notch 196 if the toast mode is selected.

Oven Switch

Once the mode switch 144 has been rotated to the oven mode thereby closing the oven switch 148 by the interaction of the cam surface 178 with the blades 180 and 188, the heating elements 54, 56, 58 and 60 are energized and the temperature in the oven chamber 22 begins to rise. To maintain the desired cooking temperature in the oven chamber 22, the operator of the toaster oven 10 selects the desired temperature level by rotation of the temperature knob or oven thermostat 128. The knob 128 controls the temperature in the oven chamber 22 by actuating the oven thermostat 152.

More specifically, the oven thermostat 152 includes a heater and lug assembly 204 of substantially an "L" shaped configuration (FIG. 4). The assembly 204 is fabricated from a heat conductive material and includes a leg 206 (FIG. 2) that extends into the oven chamber 22 through a slot 208 in the liner 18. The leg 206, and thus the assembly 204, are secured to the liner 18 by a plurality of rivets 210. In this manner, heat representative of the temperature in the oven chamber 22 is conducted by leg 206 to the assembly 204.

The thermostat 152 further includes a bimetal pusher blade 212 in heat exchange relationship with the assembly 204 by the mounting screw 214 and a heat conductive metal washer 216 mounted around the screw 214 and abutting the blade 212 and the assembly 204. Adjacent the bimetal blade 212 is a switch blade 218 that is mounted on the screw 214 and is electrically coupled by the terminal 220 formed on the blade 218 to the A.C. power source for energizing the oven 10. Adjacent to blade 218 is a second switch blade 222 also mounted on screw 214. The blades 212, 218 and 222 are electrically insulated from each other by insulation means 224 and 226. In addition, blades 218 and 222 include contacts 219 and 223, respectively, secured to one end thereof, and blade 212 includes a pusher 213 fabricated from electrical insulating material. The blades 212 and 222 are mounted in the assembly 204 such that the pusher 213 is always in contact with the blade 222. This is possible since the blades 212 and 222 are longer than the blade 218.

Adjacent the blade 222 and in electrical contact therewith is a terminal 228. The terminal 228 is electrically coupled through the anticipator heater 154 to the oven switch 148, and, specifically, to the contact 230 on blade 180. Accordingly, connection of the A.C. source to the oven switch 148 and, thus, to the heating elements 54, 56, 58 and 60 is controlled by the relative position of the switch blades 218 and 222 and their respective contacts 219 and 223. More specifically, the position of the contacts is controlled in part by the bimetal blade 212. As the blade 212 is elevated in temperature by its connection to the oven chamber 22 through the assembly 204, it bends moving the pusher 213 against blade 222 and eventually moving the contacts 219 and 223 out of engagement. When the contacts 219 and 223 are in engagement current is provided to the elements 54, 56, 58 and 60 and the temperature in the chamber 22 is elevated. When the contacts 219 and 223 are not in engagement, current to the elements 54, 56, 58 and 60 is terminated allowing the temperature in the chamber 22 to drop. Obviously, the longer the contacts 219 and 223 are in engagement the higher the temperature in the chamber 22. The period that the contacts 219 and 223 are in engagement during operation of the toaster oven 10 is controlled in part by the thermostat shaft assembly 232. The shaft assembly 232 positions the blade 218 relative to blade 222. The blades 218 and 222 are mounted on the assembly 204 to be biased against each other by a preselected force developed by the forming of the blades 218 and 222. By moving blade 218 relative to blade 222 by the shaft assembly 232, the biasing force that must be overcome to separate the contacts 219 and 223 is varied. The smaller the force the lower the temperature in the chamber 22 will be since less movement of the bimetal blade 212 is necessary to overcome the force and separate the contacts 219 and 223.

In order to establish the initial abutting force between the contacts 219 and 223, the shaft assembly 232 includes a first shaft 234 secured at one end 235 by a spring clip 236 to the knob 128 so as to be rotated by the knob 128 as the operator selects the desired temperature level. The shaft 234 is hollow and includes a slot 238 allowing access to the hollow interior. The other end 240 of the shaft 234 includes two apertures 242 and 244 (FIG. 6) extending to the hollow interior of the shaft 234. Secured to the end 240 of the shaft 234 is a second shaft 246. The shaft 246 has a bifurcated end 248 including bifurcations 250 and 252. The shaft 246 is coupled to the shaft 234 by extending the bifurcations 250 and 252 into the respective apertures 242 and 244 of end 240. This manner of coupling the shafts 234 and 246 allows the bifurcations 250 and 252 to move into and out of the interior of the shaft 236 allowing longitudinal movement of the shaft 246 relative to the shaft 234 by maintaining the connection of the shaft 236 of the shaft 246.

A second end 254 of the shaft 246 includes several threads 256 and a stop lug 258. The end 254 is threaded into an internally threaded, notched bushing 260 that is mounted in an aperture 262 in a holding plate 264. The bushing 260 is notched providing an extension 263, and holding plate 264 is firmly secured to the heater and leg assembly 204 by the screw 214 in a manner that minimizes movement of the bushing 260. Secured to the end 254 of the shaft 246 and extending through an aperture of the bushing is a pusher 266 that extends through an aperture 268 in blade 222 to abut blade 218.

Consequently, as the operator chooses the desired temperature level in the chamber 22 by rotating the knob 128, the shaft assembly 232 is rotated relative to the bushing 260 thus threading the end 254 of the shaft 246 into or out of the bushing 260. At the low and high ends of the temperature scale the lug 258 abuts extension 263 to prevent further rotation of the knob 128. As the shaft 246 is moved relative to the bushing 260, the pusher 266 moves the blade 218 thereby varying the biasing force tending to maintain the contacts 219 and 223 in an abutting relationship and varying the distance between the blade 222 and the pusher 213.

For example, as higher temperatures are selected, the shaft 246 is threaded away from the bushing 260 such that the bifurcations 250 and 252 of shaft 246 move into the interior of the shaft 234. This movement allows the blades 218 and 222 to move toward the support plate 264 under the natural resiliency of blade 218. Accordingly, blade 222 moves farther away from the pusher 213. Consequently, the bimetal blade 212 must be heated to a higher temperature since it must flex a greater distance to cause the pusher 213 to abut the blade 222 and move contact 223 away from the contact 219. Since the temperature induced in the bimetal blade 212 is a function of the temperature in the chamber 22, the temperature in the chamber 22 will also be higher in this situation.

In order to provide the oven thermostat 152 with an anticipation of the temperature level in the chamber 22 in a manner well known in the art, the anticipator heater 154 is provided. The heater 154 includes a ribbon 270 wrapped between a pair of heater cards 272 and 274 and secured to leg 276 of the heater and heat lug assembly 204. The ribbon 270 is coupled at one end to the terminal 230 on the oven switch 144 and at the other end to the terminal 228. Thus, current flow through the heater 154 is controlled first by the oven switch 144 and second by the thermostat 152.

Thermal Timer

In addition to cooking foods, the toaster oven 10 can also be employed to toast bread. To toast bread, the mode switch 144 is rotated to the toast mode. Control of toasting bread in the toaster oven 10 is by a thermal timer generally designated as 156 in FIG. 4. The thermal timer 156 controls the length of time the heating elements 54, 56, 58 and 60 are energized and in this manner controls the extent to which each slice of bread placed in the chamber 22 is toasted. The timer 156 is set as to the period of operation by rotation of the knob 132. Upon expiration of the selected period of time, the heating elements 54, 56, 58 and 60 are deenergized and, in a manner to be described, the door 34 is partially opened to vent the hot air in the chamber 22 and to open the line switch thereby deenergizing the toaster oven 10.

The thermal timer 156 is secured to a frame 278 having sides 277 and 279 and a bottom 281 (FIG. 12). The bottom 281 of the frame 278 is fastened at one end to the bottom 280 of the liner 18 by a fastener or similar device and at the other end to an end support 282. The end support 282 in turn is secured to the bottom 280 by one or more fasteners 284. The variable time capability of the thermal timer 156 is provided by a timing mechanism generally designated as 286 in combination with the shorting switch 160 (FIGS. 11 and 12). More specifically, the timing mechanism 286 includes a bimetal lever arm 288 heated by the heater 158 illustrated as a ribbon. The ribbon 158 extends along the arm 288 and is held in heat conductive relationship to the arm 288 by a strip of insulation 290 and a leaf spring 292 both of which are secured to the arm 288 by a rivet 294. The arm 288 is pivotally mounted on a pivot pin 296 that extends through apertures 298 and 300 in sides 277 and 279, respectively, of the frame 278. The arm 288 is biased upwardly about the pin 296 by a spring 302 connected at one end to an extension 304 of the arm 288 and at the other end in a slot 306 fabricated in the side 277 of the frame 278.

The bimetal lever arm 288 is also coupled to the shorting switch 160 so that the vertical movement of the arm 288 opens and closes the switch 160 to direct or shunt current to the heater ribbon 158, thereby controlling the bending of the arm 288. More specifically, the shorting switch 160 includes a stationary blade 308 mounted on an insulation block 310 that is secured to the frame 278. The blade 308 has a "U" configuration defining a contact blade 312 and a terminal 314 (FIG. 5).

The terminal 314 is electrically coupled to the heater ribbon 158, thus controlling its operation. Also, secured to the insulation block 310 is a movable contact blade 316. Electrically connected to the movable blade 316 is a terminal 317 that is electrically coupled to the A.C. power source through the lead line 319. Secured to the lever arm 288 and pivotally mounted to pivot pin 296 is an "L" shaped arm 318 that includes an extension 318a. The extension 318a includes an insulation block 320 secured to the end of the extension 318a and abutting the movable blade 316. The movable blade 316 under the influence of its natural resiliency is biased away from the blade 308 and into abutting relationship with the insulation block 320. The blade 316 is moved into contact with the blade 308 upon upward movement of the bimetal lever arm 288 due to the connection of the arm 318 to the spring 302. Upon contact of the blades 308 and 316, current is shorted across the heater ribbon 158 allowing the arm 288 to cool.

The movement of the bimetal arm 288 as it is heated and then cooled and the time needed for this action is employed to control the time of operation of a toasting cycle. The time of this action of the arm 288 is selected by the knob 132.

Thus, the bimetal lever arm 288 is coupled to and controlled by the knob 132 through the employment of a slide and cam follower assembly 322 (FIG. 9). The slide and cam follower assembly 322 includes a slide 324 secured to a cam follower 326. The slide 324 extends through apertures 329 and 331 fabricated in the sides 277 and 279, respectively, of the frame 278 in a position such that the bottom of the slide 324 is on top of the arm 288 thereby holding the arm 288 down and against the bias of the spring 302. The follower 326 includes a surface 328 that abuts against a cam 330 secured to the end of a shaft 332. The shaft 332 is affixed to the knob 132 and held in an aperture 333 in the end support 282 by a spring 335. Accordingly, as the knob 132 is rotated, the interaction of the cam 330 and the follower 326 moves the slide 324 laterally in the apertures 329 and 331. The follower 326 is biased against the cam 330 under the influence of a torsion spring 337 mounted on the side 279 of the frame 278 and which extends into an aperture 334 fabricated in the slide 324.

The movement of the slide 324 by the cam 330 moves a notch 336 fabricated in the slide 324 relative to the bimetal lever arm 288 (FIG. 9). If the knob 132 is rotated to a position for fewer pieces of bread and thus a shorter toasting period, the notch 336 is moved closer to the lever arm 288. If a longer period is selected, the notch 336 is moved to a position farther from the arm 288. Accordingly, once the knob 132 is rotated to the desired position and the mode switch 144 is moved to the toast mode, current is directed to the heater ribbon 158 thus heating the bimetal lever arm 288. The arm 288 bends and slides along the bottom of the slide 324 until reaching the notch 336. The arm 288 then enters the notch 336 allowing the arm 288 to pivot upwardly under the influence of the spring 302. This action closes the shorting switch 160 shorting current around the heater ribbon 158 allowing the bimetal lever arm 288 to cool and return to its original position. Since the arm 288 is captured in notch 336, as the arm 288 returns to its original position, the slide 324 moves with the arm 288 against the bias of the spring 337. This movement of the slide 324 cooperates with the door opening mechanism of the toaster oven 10 to open the door 34 in a manner to be described. The properties of the bimetal lever arm 288 and the location of the notch 336 in the slide 324 are selected in conjunction with the knob 132 and the configuration of the cam 330 such that the time for the arm 288 to move into the notch 336 and thereafter return to its original position is calibrated to rotation of the knob 132. This calibration allows the toaster oven 10 to properly toast bread in the chamber 22.

Door Opening Mechanism

In accordance with an important feature of the present invention, when a toasting cycle is completed and the thermal timer 156 has completed its cycle of heating and cooling the bimetal lever arm 288, the timer 156 cooperates with a door opening mechanism generally designated as 338 to partially open the door 34 and to disconnect the toaster oven 10 from the source of A.C. power. This opening of the door 34 allows hot air to escape from the chamber 22 while terminating further heating by the elements 54, 56, 58, and 60 thus preventing overtoasting of the bread in the chamber 22.

In addition, as a safety feature, after the completion of the toasting cycle and full opening of the door 34 to remove the toast and as the door 34 is closed the mode switch 144 automatically switches from the toast mode to the off mode thereby preventing inadvertent reenergization of the heating elements 54, 56, 58 and 60.

The door opening mechanism 338 cooperates with the thermal timer 156, the rack bracket 110 and the rack 82 to partially open the door 34 at the completion of a toast cycle. Thus, the door opening mechanism 338 includes four principal components (FIG. 14). The door opening mechanism 338 is mechanically coupled to the thermal timer 156 by a release lever 340. The release lever 340 is "L" shaped having legs 342 and 344. An aperture 346 is fabricated at the intersection of the legs 342 and 344 and the release lever 340 is coupled to the timer 156 by being mounted on the pivot pin 296 that passes through the aperture 346 (FIG. 12). The lever 340 is mounted on the timer 156 such that the leg 344 extends under the slide 324 in the door closed position. (FIGS. 9 and 16). In this manner, the release lever 340 is captured and held by the slide 324 in a forward position against the bias of the spring 302.

The leg 342 of release lever 340 includes a hook or shoulder 348 that provides the structure for coupling the release lever 340 to the door opening mechanism 338. The shoulder 348 captures or hooks over an extension 350 of a reset slide generally designated as 352 (FIG. 14). The reset slide 352 includes an elongated slot 354 through which extend a pair of shoulder rivets 356 and 358 (FIG. 4). The rivets 356 and 358 are secured to a frame 360 that supports the door opening mechanism 338 and is, in turn, secured to the liner 18 by a plurality of fasteners. The rivets 356 and 358 are secured to the frame 360 in a manner such that the reset slide 352 may move vertically relative to the rivets 356 and 358 in the slot 354.

Also secured to the reset slide 352 is the spring cam follower 200. The cam follower 200 interacts with the three notches 192, 194 and 196 (FIGS. 5 and 10) fabricated in the mode switch cam 166. The notches 192, 194 and 196 correspond to the off, oven, and toast modes, respectively. Accordingly, as the mode knob 126 is rotated to the desired mode, the operator has a feel when the knob 126 is in the correct position and the knob 126 is captured in this position by the follower 200. By being mounted to the reset slide 352, the follower 200 moves vertically relative to the cam 166 as the slide 352 moves relative to the rivets 356 and 358 and in the door closed configuration of the toaster oven 10, the follower 200 is positioned in one of the notches 192, 194, or 196.

Connection of the rack 82 to the door opening mechanism 338 is accomplished by the employment of a reset arm generally designated as 362 and a pallet or cam lever generally designated as 364. The reset arm 362 includes a leg 366 having a slot 368 through which extendes a pivot pin 370. The pin 370 is secured in an aperture 372 fabricated in the reset slide 352. In this manner, the reset arm 362 is pivotally and slidably secured to the reset slide 352. The reset arm 362 is also pivotally attached to the frame 360 by a pivot pin 374 and a bushing 376.

The pallet 364 is pivotally secured to a second leg 378 of the reset arm 362 by a shoulder rivet 380 that extends through an aperture 384 in the reset arm 362 and an aperture 386 in the pallet 364. The pallet 364 provides a first coupling of the door opening mechanism 338 to the rack 82 by the interaction of a pair of cam surfaces 388 and 390 defined on the pallet 364 and a roller 392 secured by a split ring 396 to a pallet exciter 394 defined on the rack bracket 110.

A second coupling of the door opening mechanism 338 to the rack 82 is provided by a rack actuating lever 398 pivotally affixed to the frame 360 by a shoulder rivet 400 (FIG. 4). The rack actuating lever 398 includes a transverse extension 402 that engages a tab 404 punched out at a right angle to the rack bracket 110. The extension 402 also engages the line switch 142 to control the electrical connection of the toaster oven 10 to the A.C. source.

The line switch 142 includes a pair of resilient switch blades 406 and 408 mounted between a pair of insulating cards 405 and 407 secured to a mounting bracket 410. The insulation block 410 is secured to the bottom 280 of the liner 18 by two twist tabs 413 (FIG. 7). Defined on one end of each blade 406 and 408 is a terminal 411 and 412, respectively. The terminal 411 is electrically coupled to the line wire 414 which, with line wire 319, is secured to and extends through the bottom 280 of the liner 18 by a combined grommet and strain relief 416. The blade 406 further includes an insulation card 418 secured to a second end thereof and engaged by the extension 402. In the door closed configuration of the toaster oven 10, the extension 402 is in a position closing the blades 406 and 408 of the line switch 142 (FIG. 4).

The door opening mechanism 338 is resiliently biased to open the door 34 through the interaction with the rack bracket 110 by a pair of springs 420 and 422. The spring 420 is attached at one end to the reset arm 362 by connection in an aperture 424 in the arm 362, and at the other end to the pallet 364 by insertion into an aperture 426 defined in a flange 428 fabricated on the pallet 364. In the door closed configuration of the toaster oven 10, the spring 420 through the pivot connection of the reset arm 362 to the reset slide 354 tends to bias the reset slide 354 upwardly against the engagement of the shoulder 348 of the lever 340 with the extension 350 of the slide 354.

The second spring 422 is connected at one end to the reset arm 362 by insertion in an aperture 430 and at the other end to the rack actuating lever 398 by insertion in an aperture 432 defined in the lever 398. In the door closed configuration, the spring 422 biases the rack actuating lever 398 in a manner tending to move the rack bracket 110 forward toward the door 34.

Operation of the Door Opening Mechanism During the Toast Mode

At the completion of the toasting operation of the toaster oven 10, the door opening mechanism 338 is actuated by the thermal timer 156 to partially open the door 34 to allow venting of hot air from the chamber 22 and to terminate the energization of the heating elements 54, 56, 58, and 60. In this manner, overtoasting of the bread placed in the chamber 22 is prevented. More specifically, to actuate the toaster oven 10 into the toast mode the operator closes the door 34 and rotates the mode switch knob 126 from the off to the toast mode. This rotation is imparted by shaft 164 to the cam 166 moving mode switch blade 190 into electrical contact with blade 182 (FIG. 15). This action electrically couples the heating elements 54, 56, 58, and 60 to an A.C. source through the thermal timer 156 (FIG. 30).

With the adjustment of the toaster oven 10 to the toast mode, the operator should adjust the knob 132 to the desired toast or brown selection. Rotation of the knob 132 is imparted to the cam 330 by the shaft 332. Rotation of the cam 330 through the interaction of the cam 330 and the cam follower 326 positions the notch 336 in the slide 324 relative to the bimetal lever arm 288 (FIG. 9).

After door 34 has been closed, the toaster oven 10 may be actuated into the toast mode by knob 126 and the desired toasting level may be selected by knob 132. Closing of the door 34 causes the rack bracket 110 to move backwardly, away from the door 34 due to its connection to the door 34 by the rack 82 and the link 114. This movement of the rack bracket 110 moves the rack actuating lever 398 to a position closing the line switch 142 (FIG. 4). Thus, when the toast mode has been selected by knob 132 after closing the door, the circuit from the A.C. source to the heating elements 54, 56, 58, and 60 is completed through the thermal timer 156.

With reference now to FIGS. 9 and 16-23, there is diagrammatically illustrated the operation of the door opening mechanism 338 once the heating elements 54, 56, 58, and 60 have been energized in the toast mode. Once the elements 54, 56, 58, and 60 are energized, the bimetal lever arm 288 is heated by the heater 158 causing the arm 288 to bend along the bottom of the slide 324 toward the notch 336 (FIG. 9). After a period of time determined by the initial relative positions of the arm 288 and the notch 336, the arm 288 moves under and into the notch 336 under the upward biasing influence of the spring 302. The upward movement of the lever arm 288 into the notch 336 rotates the entire timing assembly 286 upward thereby moving blade 316 of the shorting switch 160 into contact with the blade 308. This action shorts the heater 158 allowing the bimetal lever arm 288 to cool and return to its original position simultaneously moving the slide 324 with it since the arm 288 is captured in the notch 336.

During this operation of the thermal timer 156, the release lever 340 of the door opening mechanism 338 is held in a forward position by the slide 324, and it holds the reset slide 352 in a down position due to its mechanical coupling of the shoulder 348 with the extension 350 (FIG. 16).

As the slide 324 is moved laterally by the bimetal lever arm 288 the slide 324 is moved from its initial position of holding the release lever 340 to a position disengaged from the lever 340 (FIG. 17). In this position, the leg 344 of the release lever 340 pivots upward under the influence of the reset slide 352 which is biased upwardly by the spring 420 until leg 344 abuts the end support 282. Upon the release by the lever 340, the reset slide 352 moves upwardly until the rivet 356 engages the bottom of the slot 354. This movement rotates the reset arm 362 clockwise about the pivot pin 374 (FIG. 4) which in turn also rotates the pallet 364 clockwise about the pivot pin 374. This movement of the pallet 364 releases the engagement of the cam surface 390 of the pallet 364 with the pallet exciter roller 392 allowing the rack bracket 110 to move forward slightly toward the door 34 under the influence of the rack actuating lever 398 that is biased by the spring 422. The forward movement of the lever 398 is terminated upon the abutment of the lever 398 with a tab 399 defined on the frame 360. This movement of the rack bracket 110 partially opens the door 34 and opens the line switch 142 by the forward movement of the extension 402 with the blade 406 being biased to the disengaged position (FIG. 17). Further movement of the rack bracket 110 to allow the door 34 to open completely is prevented by the cessation of upward movement of the reset slide 352 due to the engagement of the rivet 356 with the bottom of the slot 354. This cessation of upward movement limits the extent of rotation of the reset arm 362 and this allows the spring 420 to prevent further rotation of the pallet 364. This termination of the rotation of the pallet 364 in turn limits the extent of forward movement of the pallet exciter 394 and roller 392 and, thus the bracket 110.

Once the door 34 has been partially opened and the toasting cycle completed, the operator may manually open the door 34 to its completely open position by grasping the handle 35. During the initial portion of the movement of the door 34 to its full open position, the rack bracket 110 rotates the pallet 364 against the influence of the spring 420 until the pallet exciter 394 moves free of the cam surface 390. Once this point is past, the door 34 may drop under the influence of gravity (FIG. 18).

After removing the toast from the chamber 22, the operator may close the door 34. As the door 34 is returned to its closed position, the rack bracket 110 is moved backward away from the door 34 until the pallet exciter roller 392 engages the cam surface 388 on the pallet 364 (FIG. 19). Further closing of the door 34 imparts counter clockwise rotation of the pallet 364 and of the lever 398. This rotation of the pallet 364 imparts counter clockwise rotation to the reset arm 362 thereby lowering the reset slide 352 (FIG. 20). The cam surface 388 includes a shoulder 434 and engagement of the pallet exciter 394 with this shoulder during closing of the door 34 causes the reset slide 354 to move downwardly beyond its normal position, to a point such that the rivet 358 engages the top of the slot 354. As this occurs, a longitudinal extension 436 on the reset slide 352 engages the release lever 340 forcing it downwardly below the level of the slide 324 (FIG. 21). Simultaneously, the vertical extension 437 of arm 318a is engaged by a transverse extension 438 defined on the reset slide 352 (FIG. 22). As the slide 352 moves downwardly, the extension 438 moves the arm 318a and, thus, the bimetal arm 288 downwardly out of the notch 336 (FIG. 23). This action releases the slide 324 allowing it to return to its original position under the influence of the torsion spring 337. Since the release lever 340 is simultaneously rotated, the slide 324 is moved over the leg 344 of the lever 340 capturing the lever 340 in its forward position.

Simultaneous with this action, tab 404 on the bracket 110 engages the extension 402 on the rack lever 398 (FIG. 21).

As the door 34 continues to be closed, the pallet exciter roller 392 passes over the shoulder 434 on the cam surface 388 and the spring 420 and 422 bias the door 34 completely closed (FIG. 16). At the same time, the pallet 364 rotates slightly clockwise, allowing the reset slide 352 to move upward to its normal position whereupon extensions 436 and 438 disengage the release lever 340 and the extension 437 on the arm 318a, respectively. In addition, in this latter position, the extension 402 of the rack actuating lever 398 closes the line switch 142.

Accordingly, once the door 34 is closed after removing the toast from the chamber 22, the heating elements 54, 56, 58, and 60 would be energized. However, in accordance with an important safety feature of the present invention, as the door 34 is closed after the toasting cycle, the mode switch 144 is automatically returned to the off mode. More specifically, the cam 166 includes a reduced or hollow portion 440 adjacent and below the notches 192, 194, and 196 (FIGS. 16-21 and 29). As the mode switch knob 126 is rotated, the cam follower 200 engages each notch 192, 194, and 196 to capture the cam 166 and the knob 126 in the selected mode. Once the knob 126 is rotated to the toast mode, the cam 166 is held in the notch 196 that corresponds to the toast mode. The cam 166 is held in this position against the biasing influence of a spring 442 that is wrapped around the shaft 164 of the knob 126 (FIG. 15). One end 444 of the spring 442 abuts against and is held stationary by the base 170 of the support 168. The second end 446 of the spring 442 is held by a tab 448 punched out of the bracket 172 (FIG. 6). The second end 446 of the spring 442 is contacted by a shaft 450 defined on the cam 166 that extends through a slot 452 in the bracket 172.

As the mode switch knob 132 is rotated from the off to the toast mode, the shaft 450 engages the second end 446 of the spring 442 forcing it downwardly (FIG. 15). This movement of the end 446 of the spring 442 imparts a biasing force to the cam 166 tending to bias the cam 166 and the knob 132 to the off position. The engagement of the follower 200 in notch 196, however, prevents the cam 166 and the knob 132 from returning to its off position.

After completion of the toasting cycle and the removal of the toast from the chamber 22, the door 34 is closed resulting in the reset slide 352 moving downwardly in a manner previously described. As the slide 352 moves downwardly, the cam follower 200 also moves downwardly (FIG. 20) moving the bend 202 out of the notch 196 and into the reduced portion 440. In this position, the cam 166 is no longer captured by the follower 200 and may return to the off mode under the influence of the spring 442. Upon rotating to the off position, the mode switch 146 disconnects the heating elements 54, 56, 58, and 60 from the A.C. source. Accordingly, the elements 54, 56, 58, and 60 are not inadvertently reenergized.

Alternative Embodiment

With reference now to FIGS. 24-29, there is illustrated a toaster oven 1010 that is an alternative embodiment of the toaster oven 10 previously described. The toaster oven 1010 includes the additional safety feature of automatically returning the mode switch knob 1126 to the off position after food cooked during the oven mode has been removed from the toaster oven 1010 and the door closed. In addition, the reset slide 1352 and the cam follower 1326 are different from the corresponding elements 352 and 326 in the previously described embodiment. Since substantially all of the remaining components of the toaster oven 1010 are identical with the corresponding components described in the previous embodiment, reference numerals corresponding to the numerals on the previous embodiment will be employed for the corresponding components in the alternative embodiment.

To enable the mode switch 1144 to return automatically to the off position after removing the food or toast at the completion of the oven or toast mode and the closing of the door, the cam 166 is biased by the spring 1442 (FIG. 25). The spring 1442 is wrapped around the shaft 164 of the switch 1144, and its first end 1444 and its second end 1446 are positioned on opposite sides of the tab 448. Accordingly, as the knob 1126 is rotated to move the mode switch 1144 out of the off mode to either the oven or the toast modes, the shaft 450 on the cam 166 will engage either on the leg 1444 or the leg 1446 of the spring 1442. After the mode switch 1144 is in either the oven or toast modes and the cycles are completed and as the door is returned to its closed position, the reset slide 1354 will move downwardly in the manner previously and the follower 200 will move into the reduced portion 440 of the knob 166. As this occurs, the bias of the spring 1442 will return the switch 1144 to the off position thereby preventing inadvertent reenergization of the heating elements 54, 56, 58, and 60 after the food is cooked or the bread is toasted.

To reduce manufacturing costs and to add to the repairability of the toaster oven 1010, the reset slide 1352 may include a spring arm 1351 secured to the slide 1352 (FIG. 29) by a rivet 1353. The spring arm 1351 replaces the extension 350 in the previous embodiment. The arm 1351 includes a flange 1355 that is engaged by the release lever 340 in the same manner as described in the previous embodiment. The arm 1351 is resilient allowing it to bend slightly if the hook 348 on the lever 340 and the flange 1355 are not exactly aligned, thus reducing the tolerance requirements in the manufacture of the toaster oven 1010.

In addition, the cam follower-slide 322 may be modified and manufactured as two separate items. The slide 1324 in the toaster oven 1010 (FIG. 25) is a single member having a transverse extension 1325 that extends through a slot 1327 in the end support 282. The extension 1325 is engaged by a cam follower 1326 that is secured to the end support 282 and abuts against the cam 330. In this embodiment, the cam follower 1326 functions as a lever and is bent at one end by rotation of the cam 330 and, in turn, moves the slide 1324 through its engagement at the other end with the extension 1325.

While the invention has been described with reference to details of the illustrated embodiments, it should be understood that such details are not intended to limit the scope of the invention as defined in the following claims.

What is claimed as new and desired to be secured by Letters Patent of the United States is:

1. A door opening assembly for partially opening a door comprising a rack bracket slidably secured to a housing, switch means mounted in said housing movable to a first energized position and to a second de-energized position, a first lever pivotally secured to said housing and held in a first position by a thermal timer means and released by said timer means to move to a second position upon expiration of a predetermined period, a resiliently biased slide slidably mounted in said housing, said slide engaged by said first lever in said first position of said lever and released when said first lever moves to said second position, a resiliently biased lever assembly secured to said housing coupling said slide to said rack bracket and to said switch means, said slide and said lever assembly moving said rack bracket to partially open said door and actuating said switch means to said second position upon release of said slide by said first lever.

2. A door opening assembly as set forth in claim 1, wherein said lever assembly includes a second lever pivotally connected to said housing and to said slide, a third lever resiliently and pivotally coupled to said second lever, said third lever being engageable by said rack bracket and rotatable thereby, and a fourth lever pivotally mounted in said housing and resiliently coupled to said second lever, said fourth lever engaging said rack bracket and said switch means to move said switch means from said first position to said second position upon release of said first lever by said timer means, and said rack bracket being slidable from a first to a second position by said fourth lever upon release of said first lever by said timer means.

3. A door opening assembly as set forth in claim 2, wherein said bracket includes an extension secured thereto, and a cam surface on said third lever engaged by said extension, said bracket being resiliently held in said second position, thereby resiliently maintaining said door in partially open position upon engagement of said extension with said cam surface on said third lever.

4. A door opening mechanism for partially opening a door comprising a housing defining a chamber with an open front, hinge means for securing said door to said housing at said open front, normally closed switching means mounted in said housing, a capturing lever pivotally mounted on said housing for mechanically coupling a thermal timing device to said door opening mechanism, said capturing lever including a first leg held by said timing device energization of said heating element and released after a predetermined time interval, said capturing lever including a second leg having a shoulder defined thereon, a reset slide slidably and resiliently mounted in said housing, including an extension engageable by said shoulder of said capturing lever, a first lever rotatably mounted on said housing and including first and second legs, said first leg of said first lever being pivotally secured to said reset slide and held in a first position by said reset slide when engaged by said shoulder, said first lever being movable to a second position by said reset slide when released by said capturing lever, a cam lever rotatably secured to said second leg of said first lever, including a plurality of cam faces defined thereon, a first spring resiliently connecting said first lever to said cam lever, a second lever having first and second longitudinal ends with said first end pivotally mounted to said housing and with said second end in actuating engagement with said switching means, a second spring resiliently coupling said first lever to said second lever, and a rack bracket slidably mounted in said housing, said bracket including a first portion in engagement with said second end of said second lever, said bracket including a second portion in engagement with at least one of said cam surfaces on said cam lever, said bracket being movable to a partial door open position and to actuate said switching means.

5. A door opening mechanism as claimed in claim 4 wherein said thermal timing device comprises a frame, a slide slidably mounted in said frame and engaging said first leg of said capturing lever, a bi-metal arm electrically coupled to said switching means, and means for heating said bi-metal arm.

* * * * *